(12) United States Patent
Karabelas et al.

(10) Patent No.: US 10,197,339 B2
(45) Date of Patent: Feb. 5, 2019

(54) METHOD AND APPARATUS FOR MAINTAINING A MINIMUM TEMPERATURE IN A FLUID

(71) Applicant: GE Oil & Gas UK Limited, Newcastle-upon-Tyne (GB)

(72) Inventors: George Karabelas, Newcastle-upon-Tyne (GB); Duncan Edward Reay, Newcastle-upon-Tyne (GB)

(73) Assignee: GE Oil & Gas UK Limited, Nailsea, Bristol (GB)

(*) Notice: Subject to any disclaimer, the term of this patent is extended or adjusted under 35 U.S.C. 154(b) by 4 days.

(21) Appl. No.: 15/822,980

(22) Filed: Nov. 27, 2017

(65) Prior Publication Data

US 2018/0080722 A1   Mar. 22, 2018

Related U.S. Application Data

(62) Division of application No. 14/127,480, filed as application No. PCT/GB2012/051471 on Jun. 22, 2012, now Pat. No. 9,851,157.

(30) Foreign Application Priority Data

Jun. 22, 2011   (GB) .................................. 1110569.9

(51) Int. Cl.
*F16L 9/14*   (2006.01)
*F28F 1/10*   (2006.01)
(Continued)

(52) U.S. Cl.
CPC .............. *F28F 1/10* (2013.01); *F16L 59/027* (2013.01); *F16L 59/153* (2013.01); *Y10T 29/49435* (2015.01)

(58) Field of Classification Search
CPC ....... F16L 11/16; F16L 59/027; F16L 59/153; F28F 1/10
(Continued)

(56) References Cited

U.S. PATENT DOCUMENTS 2,353,494 A   7/1944   Patten et al.
2,874,722 A   2/1959   Hamblin
(Continued)

FOREIGN PATENT DOCUMENTS

DE   10256551 A1   6/2004
DE   10308801 A1   9/2004
(Continued)

OTHER PUBLICATIONS

International Search Report and Written Opinion of the International Searching Authority, dated Jan. 7, 2013, for corresponding International Application No. PCT/GB2012/051471, 13 pages.
(Continued)

*Primary Examiner* — James Hook
(74) *Attorney, Agent, or Firm* — Klarquist Sparkman, LLP

(57) ABSTRACT

Apparatus and method for maintaining temperature in a sub-sea device, in particular in relation to fluid in the device. A material having a high latent heat on phase change is used to release latent heat to the fluid when the fluid temperature decreases towards a threshold value.

19 Claims, 20 Drawing Sheets

(51) Int. Cl.
*F16L 59/02* (2006.01)
*F16L 59/153* (2006.01)

(58) Field of Classification Search
USPC ............ 138/149, 135, 136, 129, 150, 154
See application file for complete search history.

(56) References Cited

U.S. PATENT DOCUMENTS

| | | | |
|---|---|---|---|
| 3,548,882 | A | 12/1970 | Rinker |
| 3,916,953 | A | 11/1975 | Nagayoshi et al. |
| 3,990,502 | A | 11/1976 | Best |
| 4,531,551 | A | 7/1985 | Eichelberger et al. |
| 6,000,438 | A | 12/1999 | Ohrn |
| 6,116,290 | A | 9/2000 | Ohrn et al. |
| 6,415,825 | B1 * | 7/2002 | Dupoiron .............. F16L 11/083 138/127 |
| 6,978,825 | B1 | 12/2005 | Baylot et al. |
| 7,226,243 | B2 | 6/2007 | Lee et al. |
| 8,003,028 | B2 | 8/2011 | Lawton |
| 8,353,316 | B2 * | 1/2013 | Do ..................... F16L 11/083 138/129 |
| 8,789,562 | B2 * | 7/2014 | Kagoura .............. F16L 11/081 138/104 |
| 9,046,203 | B2 * | 6/2015 | Graham ............... F16L 11/083 |
| 2004/0159422 | A1 | 8/2004 | Zuo et al. |
| 2005/0047871 | A1 | 3/2005 | Lee et al. |
| 2005/0241717 | A1 | 11/2005 | Hallot et al. |
| 2006/0131027 | A1 | 6/2006 | Chiesa et al. |
| 2006/0196568 | A1 | 9/2006 | Leeser et al. |
| 2007/0163666 | A1 | 7/2007 | Lee et al. |
| 2009/0084459 | A1 | 4/2009 | Williams |
| 2009/0301596 | A1 | 12/2009 | Van Oosten |
| 2012/0273082 | A1 | 11/2012 | Sheldrake et al. |
| 2014/0230946 | A1 | 8/2014 | Procida et al. |

FOREIGN PATENT DOCUMENTS

| | | |
|---|---|---|
| EP | 2053299 A2 | 5/2009 |
| WO | WO2006/074463 A2 | 7/2006 |
| WO | WO2011/073686 A1 | 6/2011 |

OTHER PUBLICATIONS

International Preliminary Report on Patentability and Written Opinion of the International Searching Authority, dated Jan. 9, 2014, for corresponding International Application No. PCT/GB2012/051471, 9 pages.

United Kingdom Intellectual Property Office, "Search Report" for United Kingdom Application No. GB1110569.9, dated Oct. 17, 2011, 4 pages.

Second Office Action from State Intellectual Property Office of People's Republic of China, for Chinese Patent Application No. 201280031010.0, dated Oct. 10, 2015, 22 pages (including partial English translation).

Third Office Action from State Intellectual Property Office of People's Republic of China, for Chinese Patent Application No. 201280031010.0, dated Apr. 1, 2016, 19 pages (including partial English translation).

* cited by examiner

METHOD AND APPARATUS FOR MAINTAINING A MINIMUM TEMPERATURE IN A FLUID

CROSS REFERENCE TO RELATED APPLICATION

This is a divisional application of U.S. patent application Ser. No. 14/127,480, filed Dec. 18, 2013 which is the U.S. National Stage of International Application No. PCT/GB2012/051471, filed Jun. 22, 2012, which in turn claims the benefit of and priority to United Kingdom Application No. GB1110569.9, filed Jun. 22, 2011.

FIELD

The present invention relates to a method and apparatus for providing one or more layers of a thermally active material in or on a pipe, more especially a flexible pipe. In particular, but not exclusively, the present invention relates to the use of one or more encapsulated or enclosed regions of a thermally active material, that is, a material which is effective in absorbing thermal energy in a first set of conditions and releasing thermal energy in a second set of conditions. The thermally active material is disposed in one or more layers of the flexible pipe body. The thermally active material is, in particular embodiments, a material having a high latent heat on phase change. Suitable materials are also known as phase change materials (PCM). In the present invention, the thermally active material acts as a thermal energy storage reservoir which acts to absorb heat or release "stored" heat in accordance with the temperature of the local environment to which it is subjected.

The invention relates further to a method and apparatus for preventing or delaying the formation of solids such as waxes or hydrates from a production fluid in a pipe, in particular a flexible pipe.

The present invention is especially applicable to such methods and apparatus when used or located in a sub-sea environment, an example being in the extraction and transportation of oil from sub-sea reserves.

More especially the invention relates to a method and an apparatus for preventing or delaying the formation of solids such as waxes or hydrates from a production fluid in a pipe, in particular a flexible pipe, during periods of shut down (that is, when the production fluid is present in the pipe but is not being actively conveyed). Typically in such periods, the fluid in the pipe is subject to cooling because the fluid temperature is (at least initially) higher than that of the surrounding environment.

The use of a thermally active material in accordance with the present invention is particularly advantageous with flexible pipes, but such use is not limited to flexible pipes. The use of a phase change material in accordance with the present invention is also advantageous with other types of sub-sea pipe (such as rigid pipe), apparatus and installations where a degree of temperature control is desirable. Notably, the thermally active material is advantageous where a fluid to be conveyed is subject to environmental cooling, the advantage lying in prolonging the time period before the fluid temperature falls below a threshold value. In particular applications, the threshold value is a temperature at which solid material (such as waxes or hydrates) is deposited from the fluid.

BACKGROUND

Traditionally flexible pipe is utilised to transport production fluids from one location to another.

Production fluids are fluids such as oil and/or gas and/or water when conveyed (at least in part) in a sub-sea environment, such as in connection with oil extraction.

Flexible pipe is particularly useful in connecting a sub-sea location to a further sub-sea location or sea level location. Flexible pipe is generally formed as an assembly of flexible pipe body and one or more end fittings. The pipe body is typically formed as an assembly of layered materials that form a fluid and pressure-containing conduit. The pipe structure allows large deflections without causing bending stresses that impair the pipe's functionality over its lifetime. The pipe body is generally, but not necessarily, built up as a composite structure including unbonded metallic and polymer layers.

Such unbonded flexible pipe has been an enabler for deep water (less than 3300 feet (1006 meters)) and ultra-deep water (greater than 3300 feet) developments for over 15 years. Available technology enabled the industry to initially produce in deep water in the early 1990s and in ultra-deep waters up to around 6500 feet (1981 meters) in the late 1990s. Water depths greater than 6500 feet push the envelope where typical free hanging riser configurations and flexible pipe in general can operate.

It is highly desirable to maintain the fluid in the bore of a flexible pipe at or above a suitable temperature, for example above 0° C., more especially about 40° C. or more, to prevent the formation of solids in the fluid, of which waxes and hydrates are particularly significant examples. Such solids tend to form when the temperature of the production fluid falls below a certain (known) temperature and thus cause blockages in the pipe. The temperature at which solids begin to form will vary depending on, for example, the particular composition of the fluid, but a value of about 40° C. is common. Specific means for maintaining the desired temperature can be desirable during normal operation but may not be necessary since the temperature of the fluid being conveyed is often much higher than the temperature at which solids begin to form in the fluid. Maintaining a desired minimum temperature is particularly important at times when the fluid is subject to significant cooling, notably also during periods of shut down when the fluid is essentially static within the pipe.

Conventionally, the art has sought to achieve this minimum temperature through insulation layers that form part of the pipe structure and which are intended to reduce the rate of heat loss from the bore fluid into the external environment. For flexible pipes, these insulating layers are positioned between the pressure sheath and the outer sheath of the pipe, most commonly between an outer armour layer and the outer sheath.

One prior art method of passive insulation seeks to limit the heat lost to the environment by providing insulation between the carcass and pressure sheath, thereby to isolate bore fluid from the external environment and enable heat retention. This method is disadvantageous in the sense that it simply reduces the rate at which heat is lost from the fluid contained in the bore rather than actively reintroducing heat to maintain the bore temperature.

Another prior art method consists of actively heating a flexible pipe with electrical energy, hot water, steam or other direct internal heating of the pipe. This is advantageous in the sense that it can be applied indefinitely within the pipe system. However a very significant disadvantage is that a significant amount of power is required and it is a more complicated system than passive insulation.

Occasionally, as an alternative, a cold fluid is transported along the bore of the flexible pipe. Again it is helpful to regulate the temperature of such fluids to prevent undesired heating of the fluid from a surrounding relatively warm environment.

A known prior art technique for providing a thermal insulation layer is to wind tape manufactured from a thermally insulating material helically around an underlying layer during manufacturing of flexible pipe body. Sometimes a tape formed from a polypropylene matrix with hollow glass spheres has been used which provides a low thermal conductivity (k) value and which is able to withstand reasonably high hydrostatic pressures. However, the hollow glass spheres in the tape are prone to crushing and internal and external pressures operate to squeeze the tape layer thereby reducing thickness and thus thermal insulation effects.

A further prior art technique for providing a thermal insulation layer is to extrude a layer of thermally insulating material over an underlying layer during manufacturing of flexible pipe body. Commonly a polymer matrix containing air bubbles and/or glass spheres has been used. However, this includes an additional and complicated manufacturing step which can be a complex process involving careful alignment, heating and cooling steps during manufacture. Also geometric tolerances are difficult to control during an extrusion process and this can have a knock on effect to subsequent layers formed radially outside such an extruded layer.

With either the tape or extruded layer technique mentioned above the materials used have until now limited the thermal conductivity (k) value available.

Further, the insulating materials used to date have limited heat storage capacity and have not proved able to prevent the solidification of waxes, hydrates and like materials in the pipe for a desired length of time, especially during periods of shut down.

SUMMARY

It is an aim of the present invention to at least partly mitigate the above-mentioned problems.

It is an aim of certain embodiments of the present invention to provide flexible pipe body which can be used to form a flexible pipe of a type able to transport production fluids and which includes a thermally active material. The thermally active material is effective in absorbing thermal energy in a first set of conditions and releasing thermal energy in a second set of conditions.

It is an aim of certain embodiments of the present invention to provide flexible pipe body having said material in a carcass layer and/or between a carcass layer and a barrier layer.

It is an aim of embodiments of the present invention to provide a riser assembly, jumper, flow line and/or method of manufacturing a flexible pipe able to operate in deep and ultra-deep water environments.

According to a first aspect of the present invention there is provided apparatus for providing a layer of thermally active material in a flexible pipe, comprising:

one or more encapsulated or enclosed regions of a said material disposed in a layer of flexible pipe body.

In preferred embodiments the thermally active material is a phase change material.

Preferably the phase change of the phase change material is from solid to liquid, or from a first solid phase to a second solid phase, on exposure of the phase change material to heat.

Preferably the thermally active material has a latent heat of fusion of from about 80 kJkg$^{-1}$ to about 500 kJkg$^{-1}$.

According to a second aspect of the present invention there is provided a method of manufacturing flexible pipe body, comprising the steps of:

providing one or more encapsulated regions of a thermally active material in a layer of flexible pipe body.

According to a third aspect of the present invention there is provided use of one or more regions of encapsulated or enclosed thermally active material in a layer of a flexible pipe.

According to a fourth aspect of the present invention there is provided apparatus for providing a thermally active layer in a flexible pipe, comprising:

one or more encapsulated regions of thermally active material disposed in a layer of flexible pipe body.

According to a fifth aspect of the present invention there is provided a tape for providing a layer in flexible pipe body, comprising:

an elongate tape body portion, a cross section of the tape through the body portion comprising at least one channel region holding thermally active material.

Certain embodiments of the present invention provide flexible pipe body in which at least one layer is formed substantially of a thermally active material. In addition to its ability act as a heat storage reservoir, such material may, in at least some embodiments, also provide a highly efficient insulation layer.

Certain embodiments of the present invention provide flexible pipe body in which a layer of thermally active material is formed immediately radially inside of a fluid retaining layer. This layer releases heat into, or conversely takes up heat from, the inner bore of the flexible pipe depending on the prevailing conditions, notably the local temperature of the surrounding environment. Alternatively should the flexible pipe be utilised to transport cold fluids such as liquid nitrogen the thermal insulation layer thus operates to prevent undesired heating in the bore region.

Certain embodiments of the present invention provide flexible pipe body in which a layer of thermally active material is formed close to the outer sheath of a flexible pipe body. This can retain heat within the majority of the layers of the flexible pipe in the instance that a hot fluid is transported and further allows heat to be released to fluid in the pipe body during periods of shut down. Alternatively location of such a thermally active layer can assist in keeping multiple layers within the flexible pipe body cool if a cold fluid is transported.

Throughout this specification, reference is made to one or more thermally active materials. In the context of embodiments of the present specification, a thermally active material is a material which has a high capacity (per unit volume) to absorb heat from its environment while reversibly undergoing a change of state from a first state to a second state and which releases the absorbed heat when changing from the second state to the first state. During the period change from the first state to the second state, or from the second state to the first state, the thermally active material exhibits no significant change in its temperature.

In particular herein a thermally active material is a material which has a high latent heat associated with a change of phase or state.

The change of phase may be a change from solid to liquid, solid to gas, liquid to gas or solid to solid (that is, change from one solid phase to another solid phase). In the context of the present invention, a change of state from solid to liquid on heating is preferred (and conversely the change from liquid to solid on cooling). Changes of state to or from liquid and gas or solid and gas involve too large a change in volume to be ideally suited to the present invention.

Where, as is preferred, the phase transition of the thermally active material is from solid to liquid and liquid to solid, the latent heat associated with the phase transition is the latent heat of fusion. Thus, it is preferred that the thermally active material has a high latent heat of fusion.

Preferred thermally active materials have a latent heat of fusion (expressed in kJkg$^{-1}$) of at least 80, in particular at least 90 or at least 100, or at least 150, or at least 200, or 250 or more or 300 or more such as about 350 or about 400 or about 500.

Some suitable preferred thermally active materials have a latent heat of fusion (expressed in kJkg$^{-1}$) in the range of 60 to 200, in particular 80 to 150, such as 80, 90, 100, 120, 140, 150, 170, 190 or 200.

Other suitable preferred thermally active materials have a latent heat of fusion (expressed in kJkg$^{-1}$) in the range of 210 to 300, such as 210, 220, 240, 250, 260, 280 or 300.

Further suitable preferred thermally active materials have a latent heat of fusion (expressed in kJkg$^{-1}$) in the range of 310 to 500 or more, in particular 310 to about 400, such as 310, 320, 340, 350, 360, 380, 400 or more.

Suitable thermally active materials exhibit a prolonged period during which, on heating of the material, a change of phase from the solid phase to the liquid phase occurs without any rise in temperature of the material. During this time, latent heat of fusion is being absorbed by the thermally active material.

Clearly a high value of the latent heat of fusion is most desirable for the thermally active materials in the present invention.

Likewise when the thermally active material in the liquid state cools, the material exhibits a prolonged period during which a change of phase from liquid to solid occurs without any reduction in temperature. During this time, latent heat of fusion is released by the active material.

As noted above, the present invention aims to maintain a fluid in a pipe body above a desired minimum temperature. More especially the desired minimum temperature is maintained for as long as possible when the pipe body is subject to cooling by the external environment, such as in periods of shut down when the fluid is not being actively conveyed. In this way, the formation of solid materials (that is, the deposition of solid materials from the fluid), in particular waxes and hydrates, is delayed or prevented. This effect is achieved by use of the thermally active material, also known as a phase change material.

Where, as is usually the case, the fluid being conveyed through the flexible pipe is warmer than the surrounding environment of the pipe, the thermally active material is heated by the fluid and changes phase or state. As noted, the change of phase is most preferably from solid to liquid. On heating to its melting point, and for the period of the phase change, heat is absorbed by the thermally active material from the fluid being conveyed. In particular the thermally active material takes in latent heat of fusion on changing from the solid to the liquid phase.

In the event that the fluid in the pipe no longer flows, that is, the fluid is present but is not being conveyed through the pipe, the fluid is subject to cooling and solids may ultimately form in the fluid. This may typically occur during periods of shut down. The presence of the thermally active material in the pipe structure mitigates this problem. As the fluid begins to cool, the thermally active material also cools and releases heat to the fluid in the pipe. Because the thermally active material is selected to have a high latent heat of fusion, enough heat is released by the thermally active material to the fluid in the pipe to limit the cooling of the fluid. In particular, the cooling of the fluid is limited to the extent that solid materials such as waxes or hydrates are not formed in the pipe.

It is important in accordance with the present invention to select a thermally active material which has a melting point (or other temperature at which the relevant phase change occurs, as appropriate) which correlates to the desired minimum temperature at which the fluid in the pipe should preferably be maintained. The melting point of the thermally active material is desirably such that, at normal operating temperatures, the thermally active material is in the liquid state. The temperature of the fluid being conveyed in the pipe varies from application to application, but is typically in the range of from about 30° C. to about 125° C. with some systems operating at 150° C. or higher. The upper limit of the normal operating temperature for the fluid in the pipe is not usually critical, provided that the thermally active material is selected to withstand that temperature during the operating life of the pipe. The temperature of the fluid in the pipe at which solids such as waxes or hydrates start to be deposited from the fluid in the pipe is of greater importance. For convenience, this is termed the "deposition temperature". Typically this deposition temperature is about 30° C. to 50° C. and especially about 40° C. Clearly, the deposition temperature will vary with, for example, the composition of the fluid being conveyed in the pipe, its source and previous treatments to which the fluid has been subjected (if any). Ideally the melting point of the thermally active material should be not more than about 5° C. to 10° C. more than the deposition temperature the fluid in the pipe.

It will be appreciated that the use of the thermally active material in accordance with the present invention allows longer periods of shut down (when fluid is present in the pipe but not being conveyed), such as during maintenance periods, and/or allows lesser amounts of insulation to be used in the manufacture of the flexible pipe.

Based on the teaching of this specification, the person of ordinary skill in the art will be able to select suitable thermally active materials appropriate to any particular application, for example to ensure that the melting point of the thermally active material is correlated with the deposition temperature of the fluid being conveyed. The skilled person will naturally select a thermally active material which can withstand the conditions of operation, such as possible extremes of temperature associated with sub-sea application. Also, the skilled person will select a thermally active material which has an effective operational life which is aligned with that of the pipe (or other apparatus) with or in which the thermally active material is employed.

Numerous thermally active materials are known, of which salt hydrates, fatty acids and esters, various paraffins (such as octadecane) and ionic liquids are examples.

BRIEF DESCRIPTION OF THE DRAWINGS

Embodiments of the present invention will be described hereinafter, by way of example only, with reference to the accompanying drawings in which.

DETAILED DESCRIPTION

Figure 1:
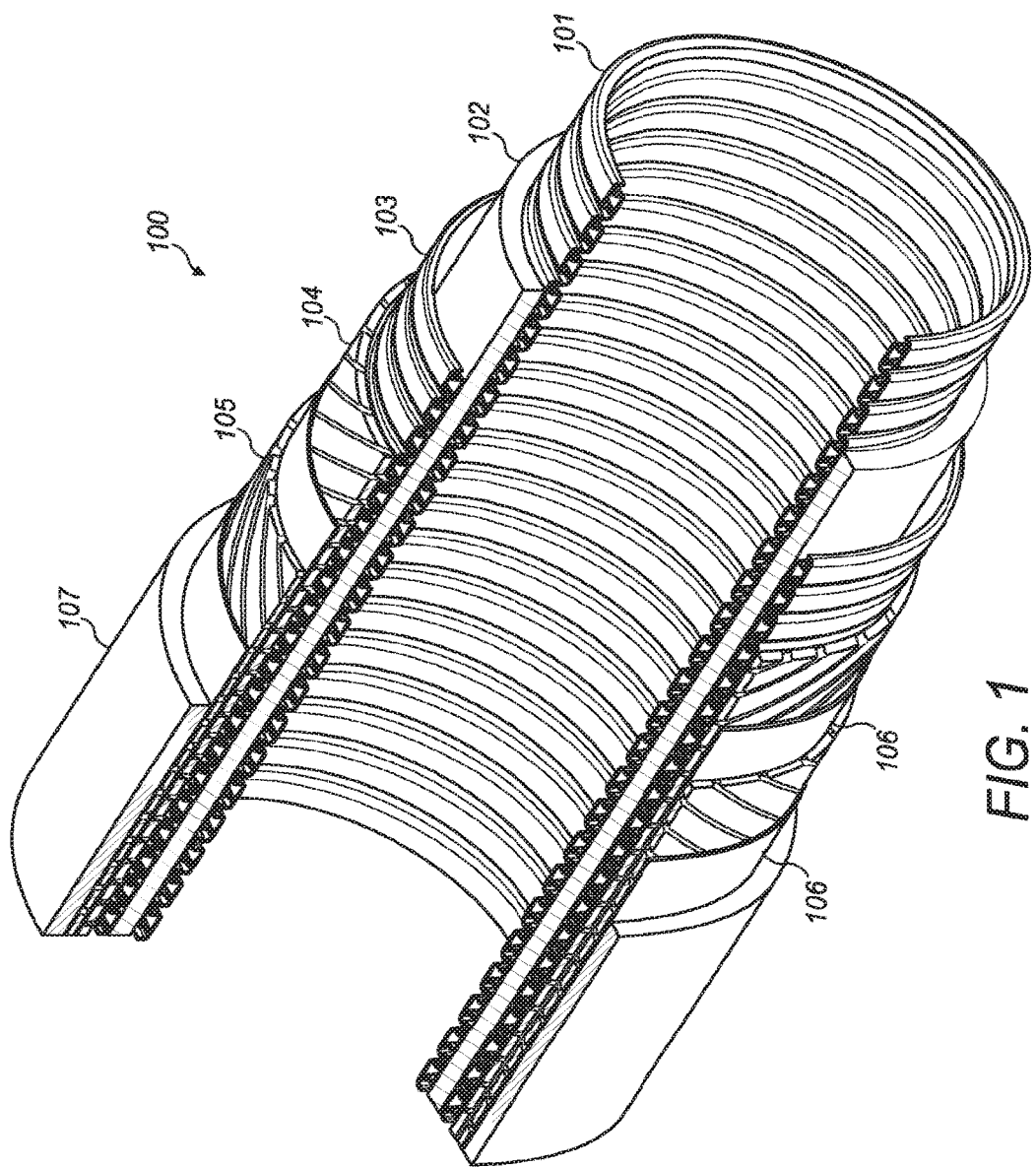
FIG. 1 illustrates a flexible pipe body.

In the drawings like reference numerals refer to like parts.

Throughout this specification reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers manufactured from a variety of possible materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. It will be appreciated that certain embodiments of the present invention are applicable to 'smooth bore' as well as such 'rough bore' applications.

The internal pressure sheath 102 acts as a fluid retaining layer and comprises a polymer layer that ensures internal-fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth-bore operation) the internal pressure sheath may be referred to as a liner.

An optional pressure armour layer 103 is a structural layer with a lay angle close to 90° that increases the resistance of the flexible pipe to internal and external pressure and mechanical crushing loads. The layer also structurally supports the internal-pressure sheath.

The flexible pipe body also includes an optional first tensile armour layer 104 and optional second tensile armour layer 105. Each tensile armour layer is a structural layer with a lay angle typically between 20° and 55°. Each layer is used to sustain tensile loads and internal pressure. The tensile armour layers are counter-wound in pairs.

The flexible pipe body shown also includes optional layers 106 of tape which help contain underlying layers and to some extent prevent abrasion between adjacent layers.

The flexible pipe body also typically includes an optional outer sheath 107 which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
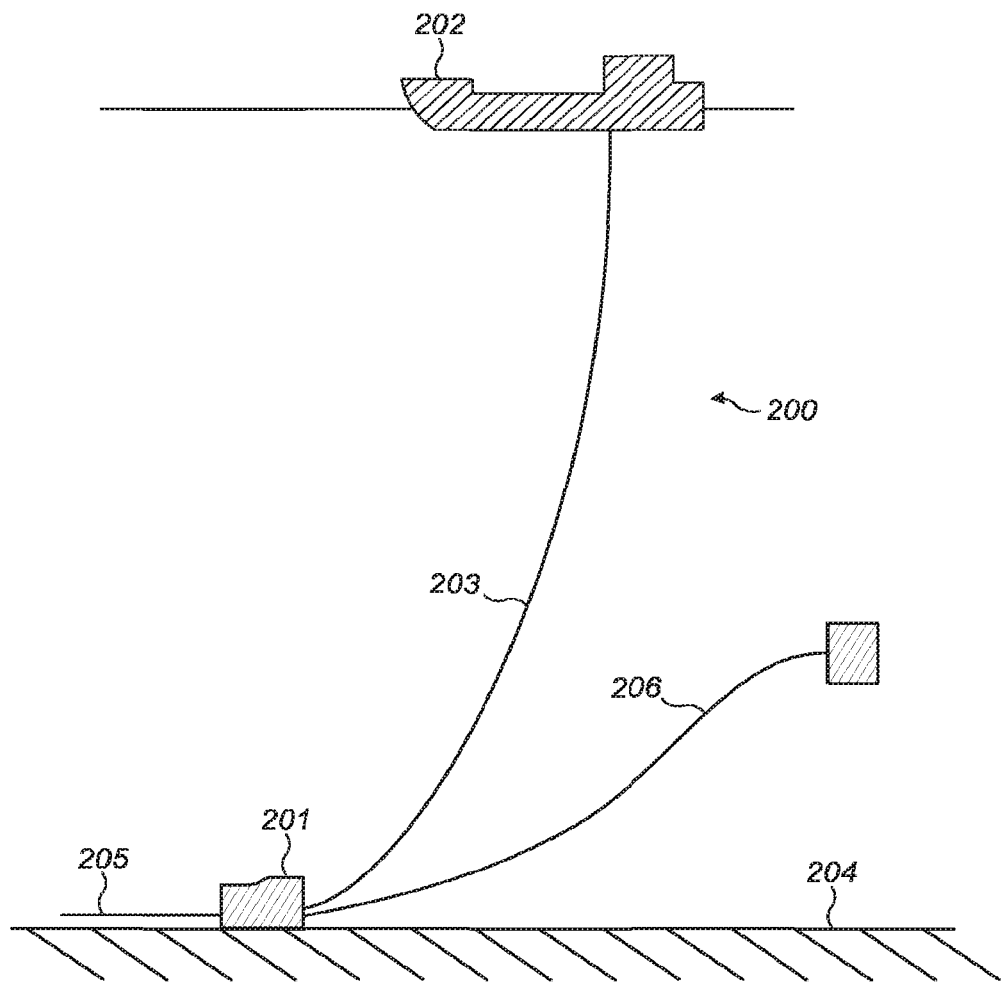
FIG. 2 illustrates a catenary riser, flow line and jumper.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe body can be utilised as a flow line 205 or jumper 206.

Figure 3:
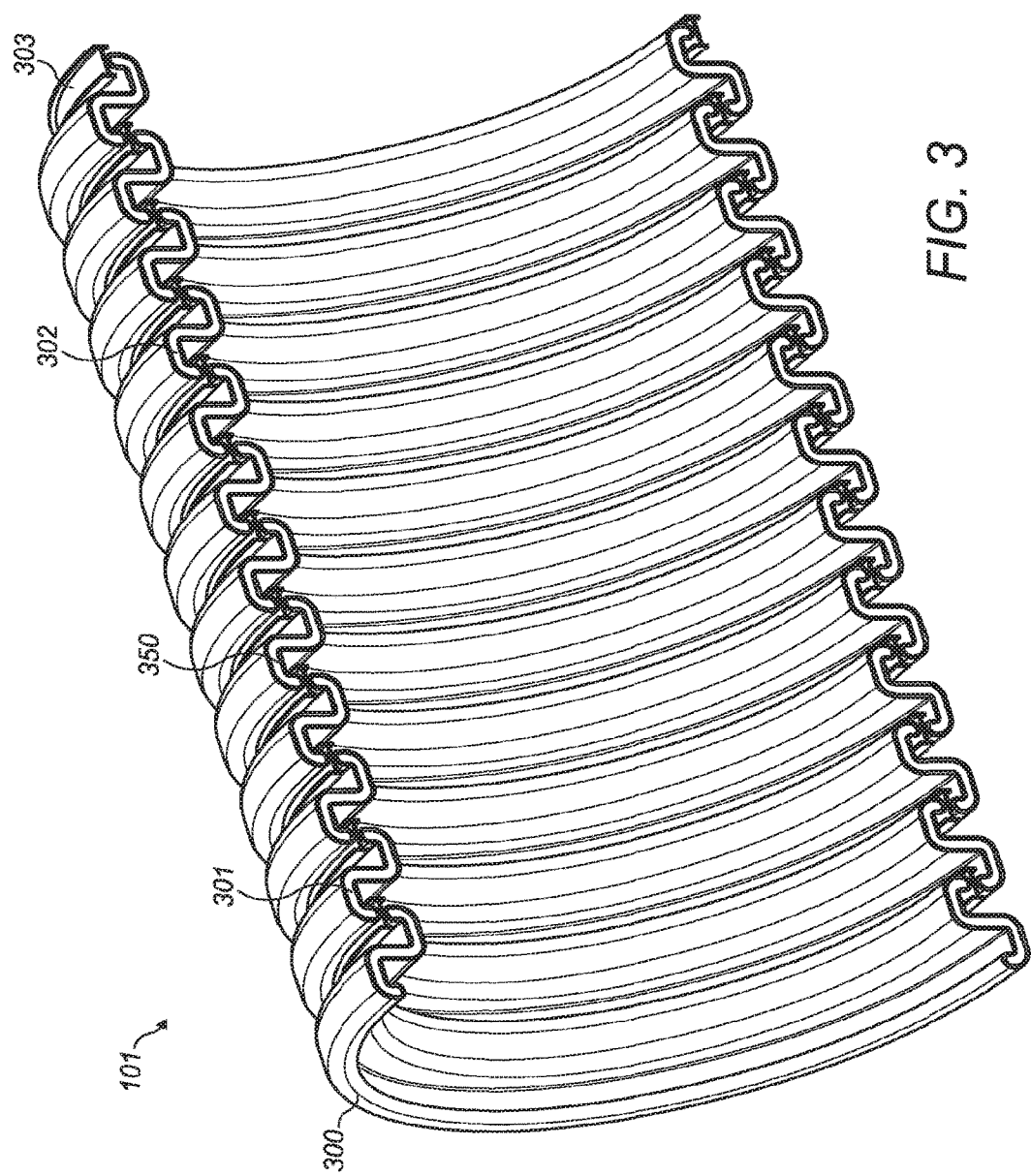
FIG. 3 illustrates a carcass layer including regions of thermally active material.

FIG. 3 illustrates a carcass layer 101 made by helically winding a tape 300 so that adjacent windings can interlock. The tape 300 has a substantially Z shape and the body of the tape is hollow. The body may be almost wholly hollow in which case the body acts like a shell (as shown in FIG. 3) or alternatively may be only partially hollow so that only a region of the cross section is hollow or multiple separate regions are left hollow. The body of the tape thus encapsulates or encloses at least one void, chamber or channel region within the tape. The channel region may preferably be a closed cavity extending substantially long the whole length of the tape. This channel region 301 is filled with a thermally active material 350 and the thermally active material is retained within the channel region 301 in use.

As illustrated in FIG. 3 adjacent windings of the Z shaped tape 300 are interlocked by additionally helically winding a connecting tape 303 between adjacent windings of the carcass tape. The connecting tape winding 303 has a generally H shaped cross-section.

Figure 4:
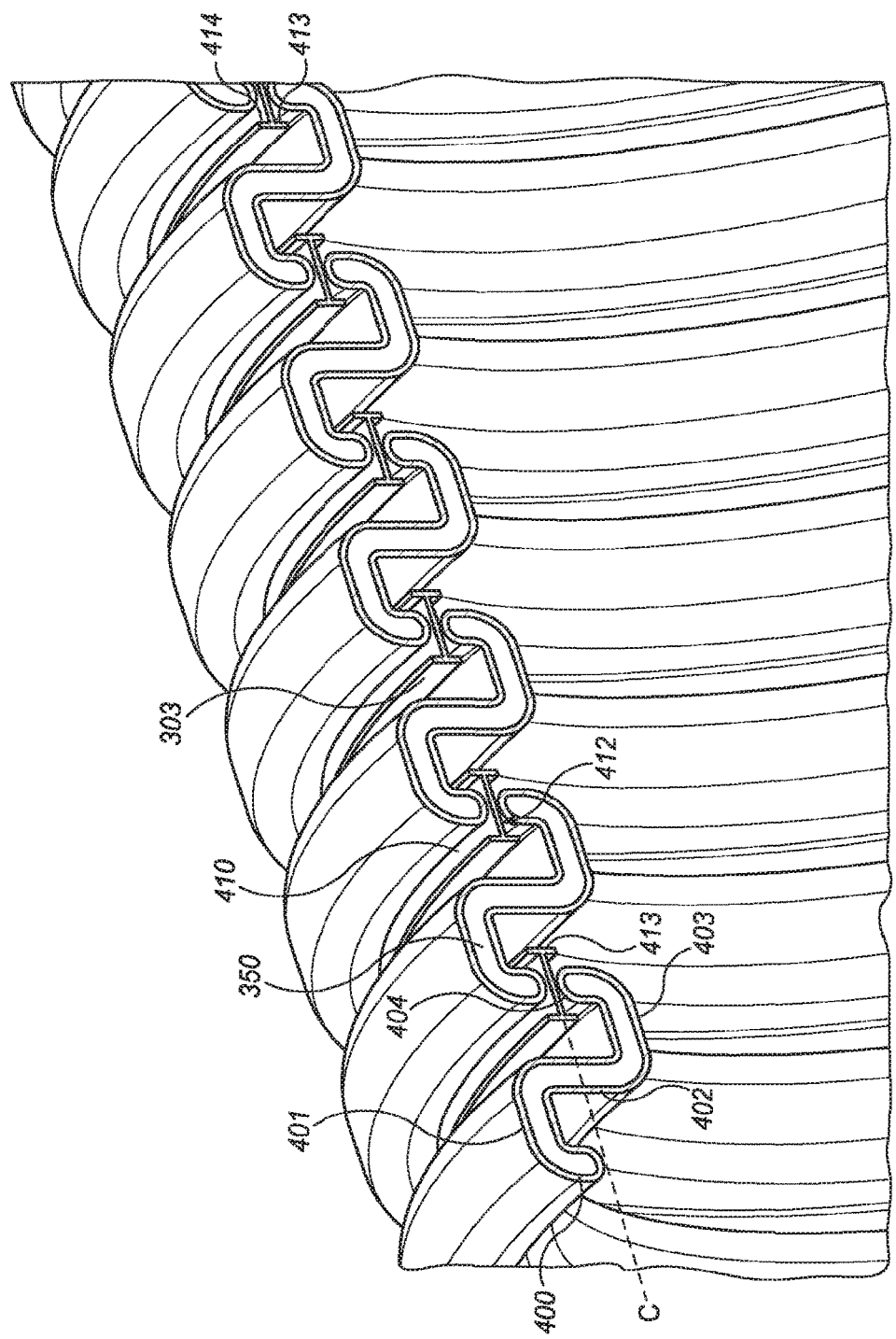
FIG. 4 illustrates windings in the carcass layer of FIG. 3.

FIG. 4 illustrates the windings of FIG. 3 in more detail. The wound tapes form a layer extending axially along the length of the flexible pipe body. The cross section of the carcass tape 300 has an imaginary centre line C and has an inwardly turned nose 400 at a first edge of the tape. The nose 400 blends into a horizontal region 401 and the tape is then bent into a substantially linear region 402 which extends firstly towards the centre line and then away from the centre line. The central region 402 of the tape then turns away from the direction of the first edge into a further horizontal region 403 before bending again in towards the imaginary centre line C terminating in a further nose 404. This further inwardly turned nose forms the other edge of the carcass tape. In terms of the windings shown in FIG. 4 the first nose is turned downwardly towards the imaginary centre line and the further nose is turned upwardly towards the imaginary centre line. It will be appreciated that whilst the noses shown in this and further examples have rounded ends, other shaped ends are useable.

As illustrated in FIG. 4, the connecting tape 303 has a substantially H-shaped cross section providing an upwardly facing substantially horizontal riding surface 410 and an opposed substantially parallel spaced apart downwardly facing substantially horizontal further riding surface 412. As illustrated in FIG. 4 an upwardly turned nose 404 of a first winding rides against the downwardly facing horizontal riding surface 412 of the connecting tape between ends which act as abutment surfaces 413 which form boundaries to the riding surface. This allows for some lateral motion between adjacent windings. A downwardly turned nose 400 of an adjacent winding is able to ride on the upward facing riding surface 410 of the H-shaped connector tape between respective abutment surfaces 414 which form side boundaries to the riding surface.

The carcass tape is preformed prior to winding to manufacture a carcass layer and the, or each, channel region 301 formed within the body of the tape is filled with thermally active material 350. In this way the body of the tape encapsulates the thermally active material 350. That is, the thermally active material 350 is enclosed and retained within the channel region 301 of the tape. As consecutive windings are wound and interlocked together with the connecting tape the effect is that one or more encapsulated regions of thermally active material are laid out in a layer along the axial length of the flexible pipe body.

It will be appreciated that during manufacture of the carcass tape (that is to say before the stage of manufacturing flexible pipe) the channel region within the tape can optionally first be evacuated to help reduce thermal conductivity across the tape. Also the use of rigid material (such as metal or composite materials or the like) to manufacture the body of the tape means that low density thermally active materials may be used since the rigidity of the tape material acts as a housing to give the tape strength.

Figure 5:
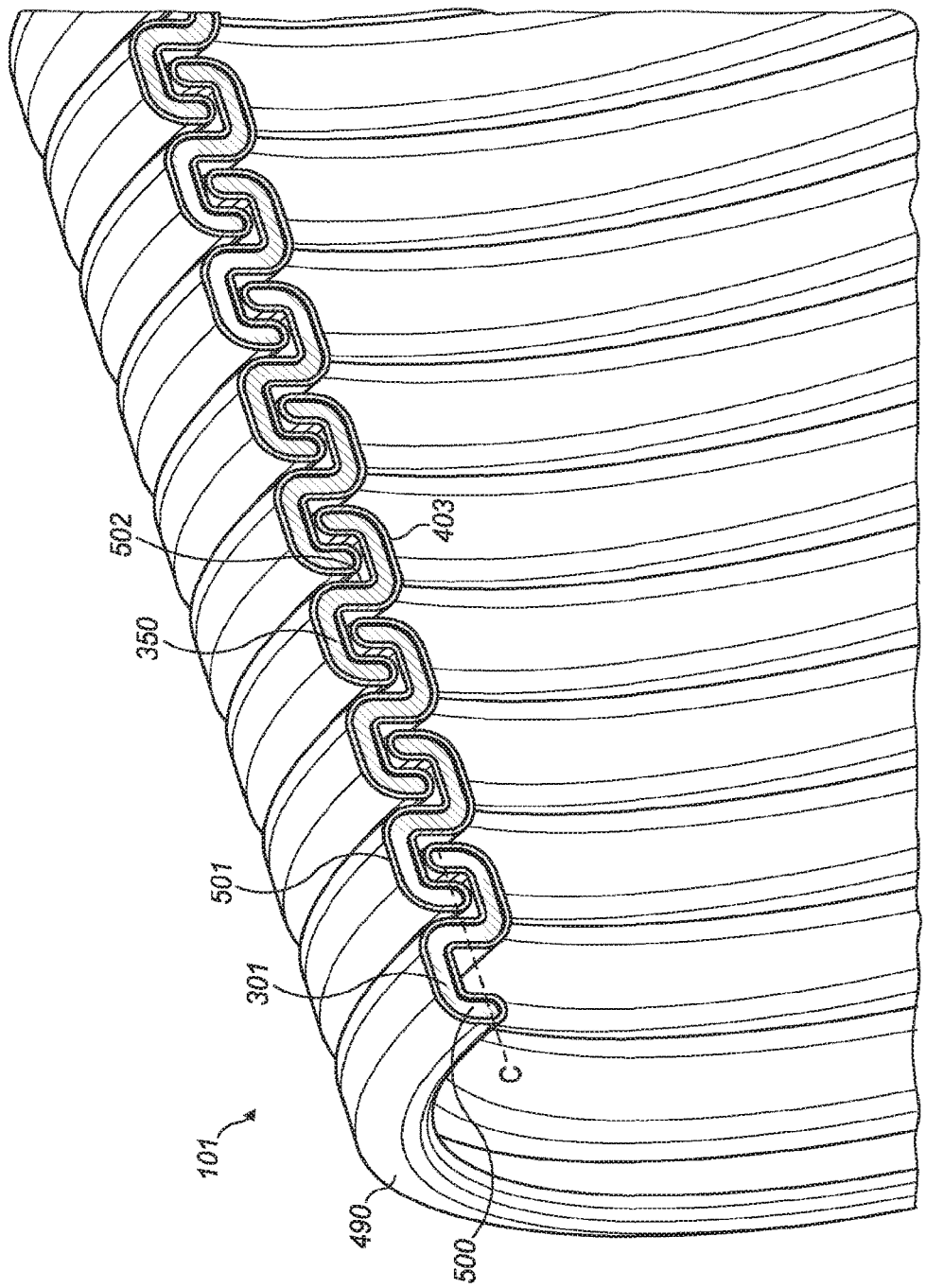
FIG. 5 illustrates an alternative carcass layer including regions of thermally active material.

FIG. 5 illustrates an alternative to the carcass layer illustrated in FIGS. 3 and 4 in which adjacent windings of the carcass layer tape are interlocked by nesting a hook region of one winding into a valley region of an adjacent winding. The connecting tape is thus not required.

As illustrated in FIG. 5 a carcass layer 101 is formed by helically winding a tape 490 so that adjacent windings can interlock. The cross section of the carcass tape 490 is a substantially Z-shape and the body of the tape is wholly or partially hollow. As with the previous example the body can be a shell encapsulating a single channel or can define more than one channel by having a partially filled body cavity region. The body of the tape thus encapsulates or encloses at least one channel region within the tape. This channel region 301 is filled with a thermally active material. The wound tape thus forms a layer extending axially along the length of the flexible pipe body. The cross section of the carcass tape 390 has an imaginary centre line C and has an inwardly turned nose 500 at a first edge of the tape. The nose 500 blends into a horizontal region 501 and the tape is then bent into a substantially linear region 502 firstly towards the centre line and then away from the centre line. The central region 502 of the tape then turns away from the first edge into a further horizontal region 503 before bending again in towards the imaginary centre line C terminating in a further nose 504. This further inwardly turned nose forms the other edge of the carcass tape. In terms of the winding shown in FIG. 5 the first nose 500 is turned downwardly towards the imaginary centre line and the further nose is turned upwardly towards the imaginary centre line.

As illustrated in FIG. 5, adjacent windings of the carcass layer tape 490 interlock together. In this sense the first nose and first horizontal region 501 and part of the central linear region 502 form a hook portion whilst a remaining portion of the central linear region 502, further horizontal portion 503 and further upwardly turned nose 504 define a valley region. A nose associated with the hooked portion of a winding nests within the valley region defined by an adjacent winding. The nose of a winding is thus able to ride within a region defined in an adjacent winding between a further nose and a central region of the winding. This prevents windings in the carcass layer from becoming separated but allows some lateral motion so that the flexible pipe body formed by the carcass layer can flex. Nesting is carried out during manufacture as the carcass tape is wound.

The carcass tape 490 is preformed prior to winding to manufacture a carcass layer and the, or each, channel region formed within the body of the tape is filled with thermally active material. In this way the body of the tape encapsulates or thermally active material. That is, the thermally active material is enclosed and retained within the body of the tape, in the channel region. As windings are wound and interlocked together the effect is that one or more encapsulated regions of thermally active material are laid out in a layer of the flexible pipe body.

It will be appreciated that during manufacture of the carcass tape (that is to say before the stage of manufacturing of flexible pipe) the channel region within the tape can optionally first be evacuated to help reduce thermal conductivity across the tape. Also, the use of rigid material (such as metal or composite materials or the like) to manufacture the body of the tape means that low density thermally active materials may be used.

Figure 6:
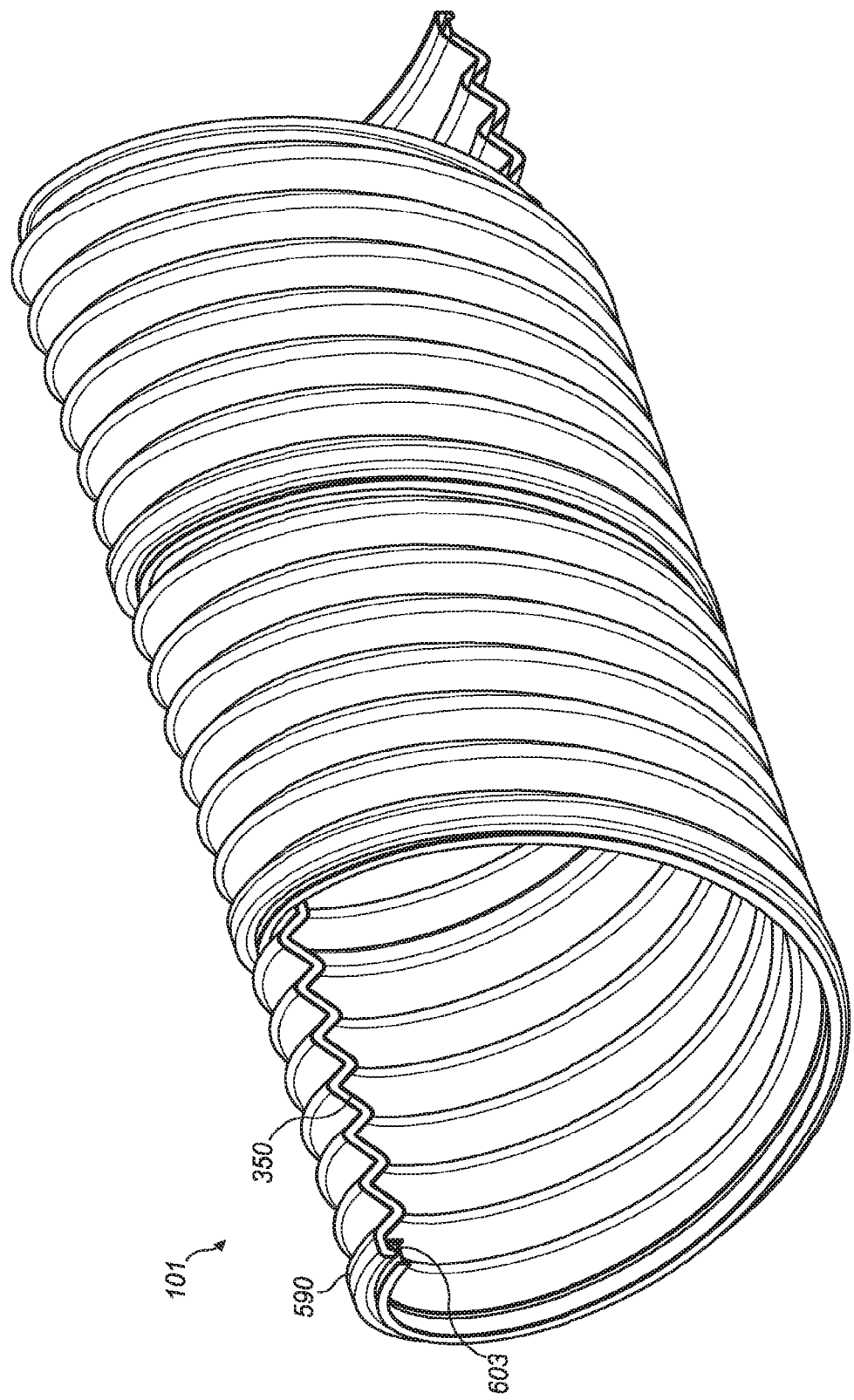
FIG. 6 illustrates a carcass layer including regions of thermally active material.

FIG. 6 illustrates an alternative to the carcass layer illustrated in FIGS. 3 to 5. As illustrated in FIG. 6 adjacent windings of a carcass layer tape having a corrugated cross section can be helically wound to create the carcass layer. Adjacent windings are interlocked using a connecting tape at the interface between adjacent windings.

As illustrated in FIG. 6 a carcass layer 101 is formed by helically winding a tape 590 so that adjacent windings are interlocked in some fashion. The cross section of the carcass tape 590 is corrugated including peaks and troughs and the body of the tape is wholly or partially hollow. The body of the tape thus encapsulates a channel region which itself has a corrugated shape within the tape. This channel region 301 is filled with a body of thermally active material which thus adopts the undulating cross section. The wound tape thus forms a layer extending axially along the length of the flexible pipe body.

Figure 7:
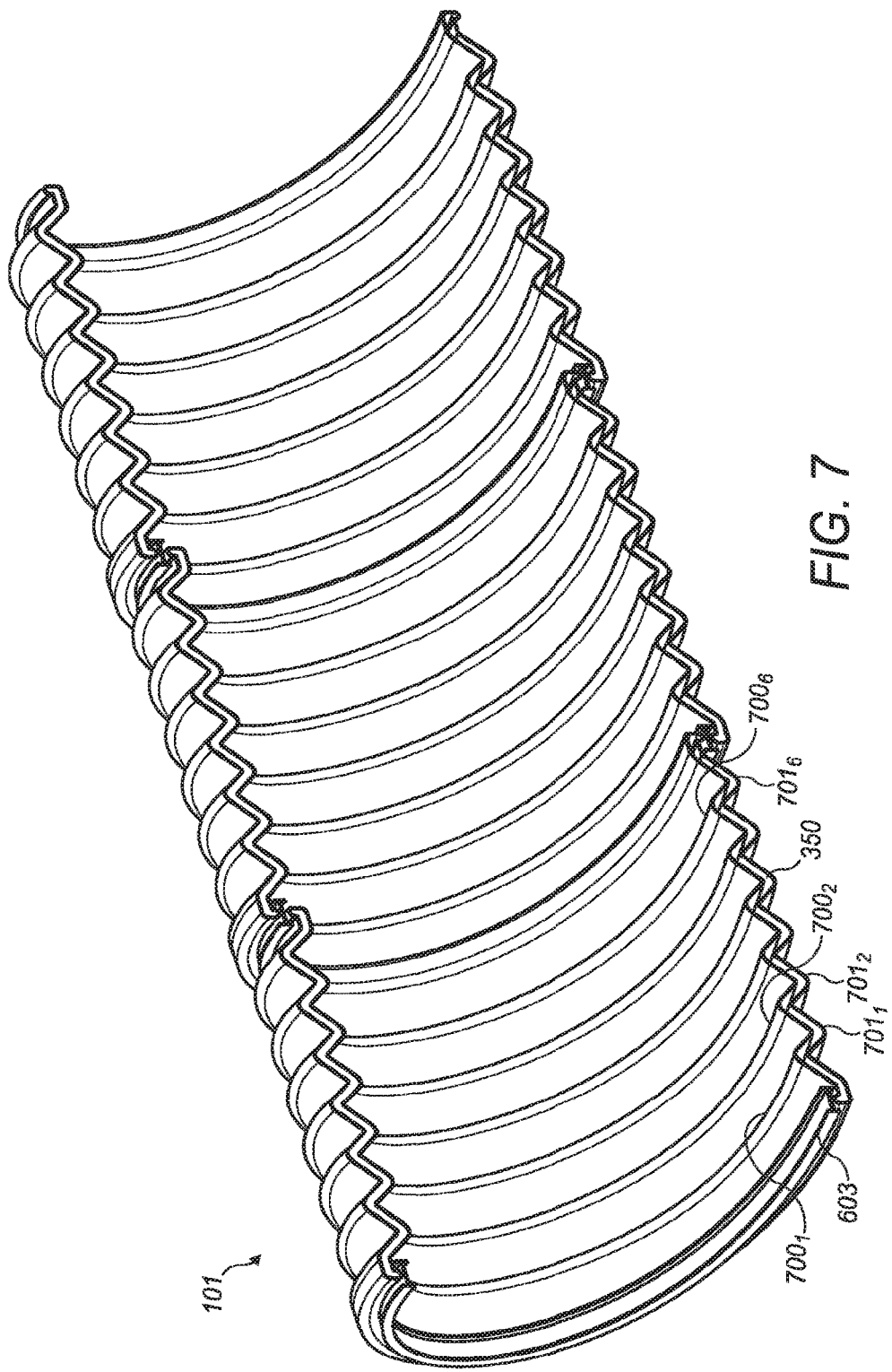
FIG. 7 illustrates windings in the carcass layer of FIG. 6.

FIG. 7 illustrates the helically wound carcass tape 590 shown in FIG. 6 in a cut away format indicating how the carcass layer 101 is formed by winding a carcass tape 590 helically. The carcass layer tape has a corrugated profile with six complete troughs $700_1$ to $700_6$. The troughs are the portions of the corrugations which extend radially innermost within the bore defined by the wound tape. The corrugated tape also includes six complete peaks $701_1$ to $701_6$ which define the radially outermost parts of the carcass layer. Tape having different numbers of peaks and troughs and different pitches to those peaks and troughs shown can of course be used. As windings are wound a connecting tape which has a substantially H-shaped cross section is also helically wound simultaneously at the interface between adjacent windings of the carcass layer tape 494. The cross sectional H-shape of the connecting tape 603 is illustrated in FIG. 7. Other connecting tapes having different cross sectional shapes but which permit interlocking can, of course, be used.

Figure 8:
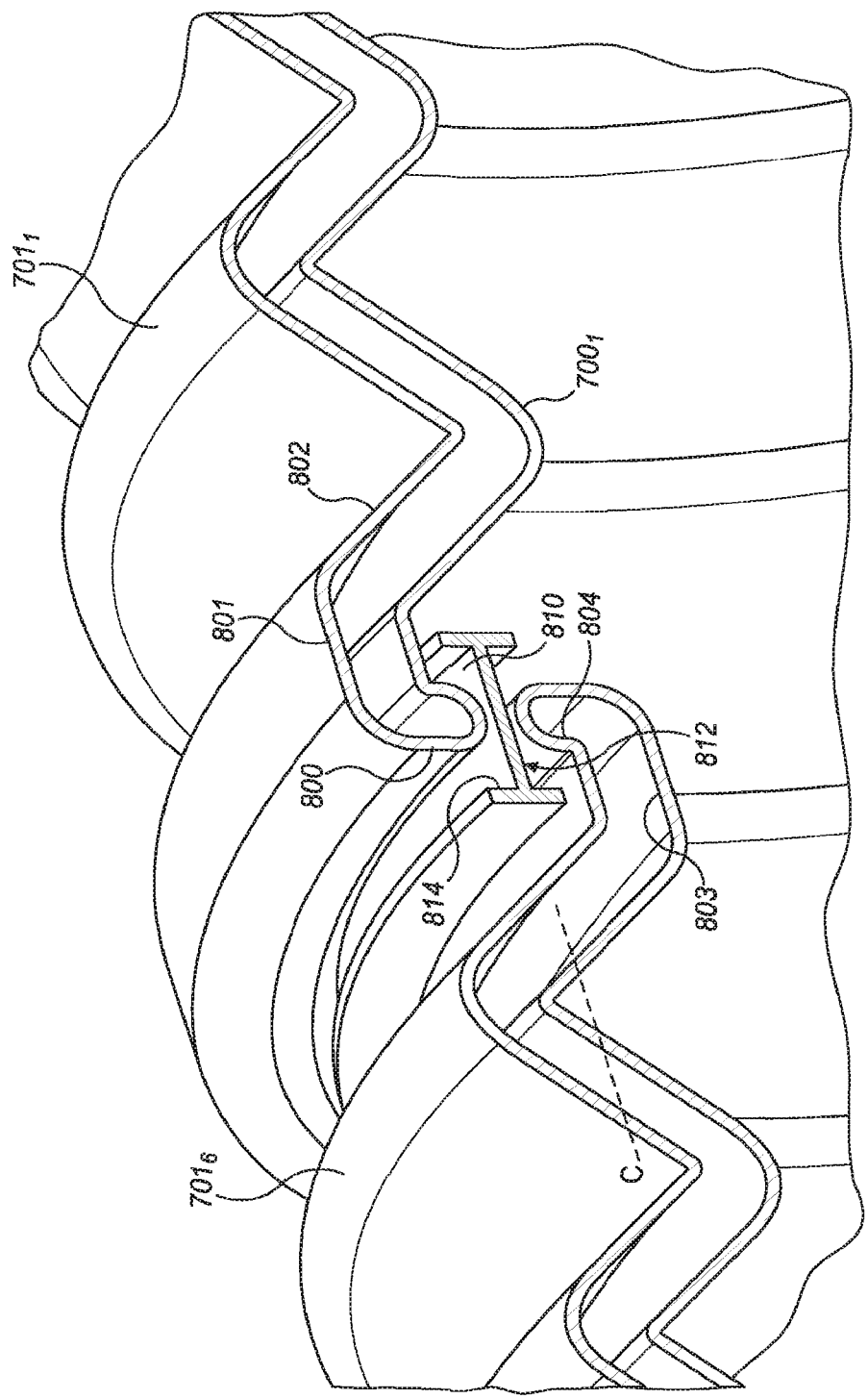
FIG. 8 illustrates interlocking of carcass layer windings.

FIG. 8 illustrates a cross-section through a region where adjacent windings of the carcass layer tape 590 are interlocked together. The cross section of the carcass tape 590 has an imaginary centre line C and has an inwardly turned nose 800 at a first edge of the tape. The nose 800 blends into a horizontal region 801 and the tape is then bent at an inclined angle towards the centre line. A linear region 802 extends through the centre line towards a first trough region which defines a radially innermost fold or corrugation for the carcass tape. At this trough the tape is bent before extending radially outwardly in a further linear region towards a first peak region $701_1$. Further peaks and troughs are laid out across the cross section of the corrugated carcass tape 690. The tape extends from the final peak $701_6$ into a further horizontal region 803 before bending again in towards the imaginary centre line C terminating in a further nose 804. This further inwardly turned nose forms the other edge of the carcass tape. In terms of the windings shown in FIGS. 6, 7 and 8 the first nose 800 is turned downwardly towards the imaginary centre line and the further nose 804 is turned upwardly towards the imaginary centre line.

As illustrated in FIG. 8 the connecting tape 603 has a substantially H-shaped cross section providing an upwardly facing substantially horizontal riding surface 810 and an opposed substantially parallel spaced apart downwardly facing substantially horizontal further riding surface 812. As illustrated in FIG. 8 an upwardly turned nose 804 of a first winding rides against the downwardly facing horizontal riding surface 812 of the connecting tape between abutment surfaces 813 which form boundaries to the riding surface. This allows for some lateral motion between adjacent windings. A downwardly turned nose 800 of an adjacent winding is able to ride on the upward facing riding surface 810 of the H-shaped connector tape between respective abutment surfaces 814 which form side boundaries to the riding surface.

The carcass tape 590 is preformed prior to winding to manufacture a carcass layer and a channel formed within the body of the tape is filled with a thermally active material. In this way the body of the tape encapsulates thermally active material. That is, the thermally active material is enclosed and retained within the channel region. One, two or more channels may be formed containing the thermally active material. Where more than one channel is present, different thermally active materials may be used in the different channels. As windings are wound and interlocked together with the connecting tape the effect is that one or more encapsulated regions of thermally active material are laid out in a layer of the flexible pipe body.

It will be appreciated that during manufacture of the carcass tape (that is to say before the stage of manufacturing flexible pipe) the channel region within the tape can optionally first be evacuated to help reduced thermal conductivity across the tape. Also, the use of rigid materials (such as metal or composite materials or the like) to manufacture the body of the tape means that low density thermally active material may be used.

It will be appreciated that the corrugated carcass tape could be modified at the nose regions so that adjacent windings of the corrugated tape interlock in a manner similar to the windings shown in FIG. 5 and without the intervening connecting tape being needed.

In addition to providing encapsulated regions of thermally active material in a carcass layer of flexible pipe, tape including thermally active material may additionally, or optionally, be wound at other locations so as to provide one or more alternative or further layers of thermally active material as required. For example, a layer of thermally active material may be formed immediately inside an outer sheath 107 of the flexible pipe body. Such a layer of thermally active material will assist in maintaining a warm or cool temperature throughout the multiple layers of the flexible pipe body as determined by the temperature of the fluid transported along the bore of the flexible pipe body. More particularly, a layer of thermally active material will maintain the temperature of fluid within the bore of the flexible pipe body within a desired temperature range (notably above a minimum temperature) for a longer period of time when the fluid is otherwise subjected to heating or cooling (such as during a period of shutdown, in the case of cooling). Alternatively, or in addition, a thermally active layer may be formed radially immediately outside or inside of the tensile armour layers so as to maintain the metallic parts of those tensile armour layers within a predetermined temperature range. A layer, or a plurality of layers, of thermally active material may be formed at any other desired location throughout the cross section of the flexible pipe body.

Figure 9:
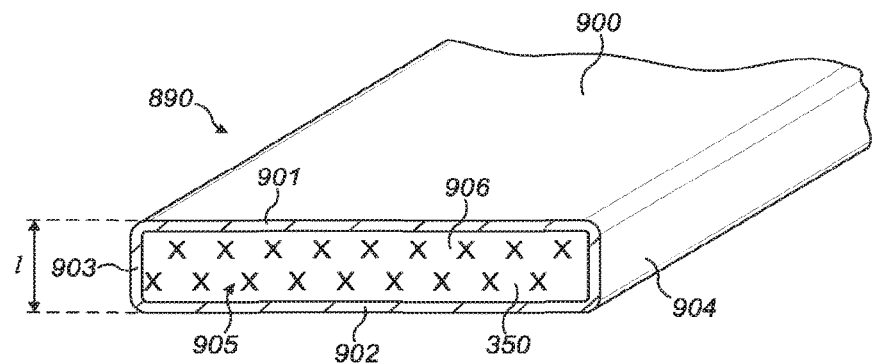
FIG. 9 illustrates a tape including a thermally active material.

FIG. 9 illustrates a tape 890 in cross section which may be wound helically around an underlying layer during manufacture of flexible pipe body. As indicated in FIG. 9 the tape 890 has an outer surface 900 which forms the body to the tape. The body 900 includes a substantially planar top surface spaced apart from and substantially parallel to an underlying bottom surface 902. Side walls connect the top surface 901 and bottom surface 902. The first side wall 903 of the body 900 and further side wall 904 of the body 900 together with the top and bottom surface thus form a shell like body. The central region 905 defined by the inner surface of the top and bottom surfaces and side walls defines a channel 906. This channel is filled with thermally active material 350.

Figure 10:
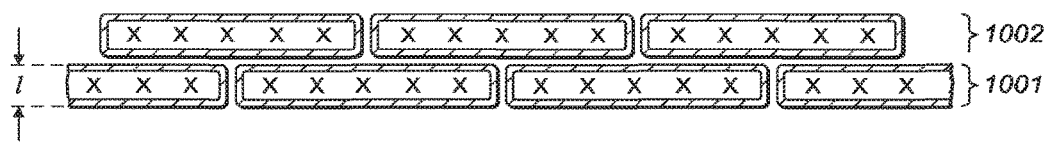
FIG. 10 illustrates how the tape shown in FIG. 9 can be wound.

The tape shown in FIG. 9 can be wrapped helically in a number of ways to create a layer in the flexible pipe body. For example as shown in FIG. 10 the flexible tape is helically wound in a first layer 1001 with adjacent windings being located side by side. A further layer of tape 890 is wound over this first layer 1001 to form an overlying layer 1002. As illustrated in FIG. 10 this overlying layer can lie over the interconnection of adjacent windings in the layer below. Alternatively the overlying layer can be wound directly on top of an underlying layer. As a result a layer of thermally active material made from multiple sub-layers is generated.

Figure 11:
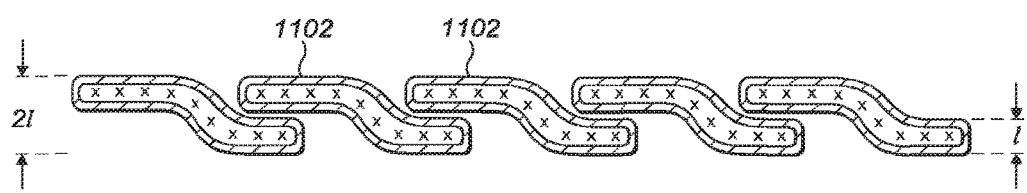
FIG. 11 illustrates how the tape shown in FIG. 9 can be wound.

FIG. 11 illustrates an alternative way in which the insulating tape 890 shown in FIG. 9 can be wound over an underlying layer. As illustrated in FIG. 11 subsequent to a preceding winding being duly wound a subsequent winding 1101 is wound so that a portion of the subsequent winding 1101 lies over an underlying portion of a preceding winding 1102. The net effect of the two methods illustrated in FIGS.

10 and 11 is that a layer of thermally active material having a thickness twice that of the thickness 1 of the insulating tape 890 is generated. It will be appreciated that if only one winding is utilised using the technique shown in FIG. 10 that a layer of thermally active material having a thickness 1 is generated.

Figure 12:
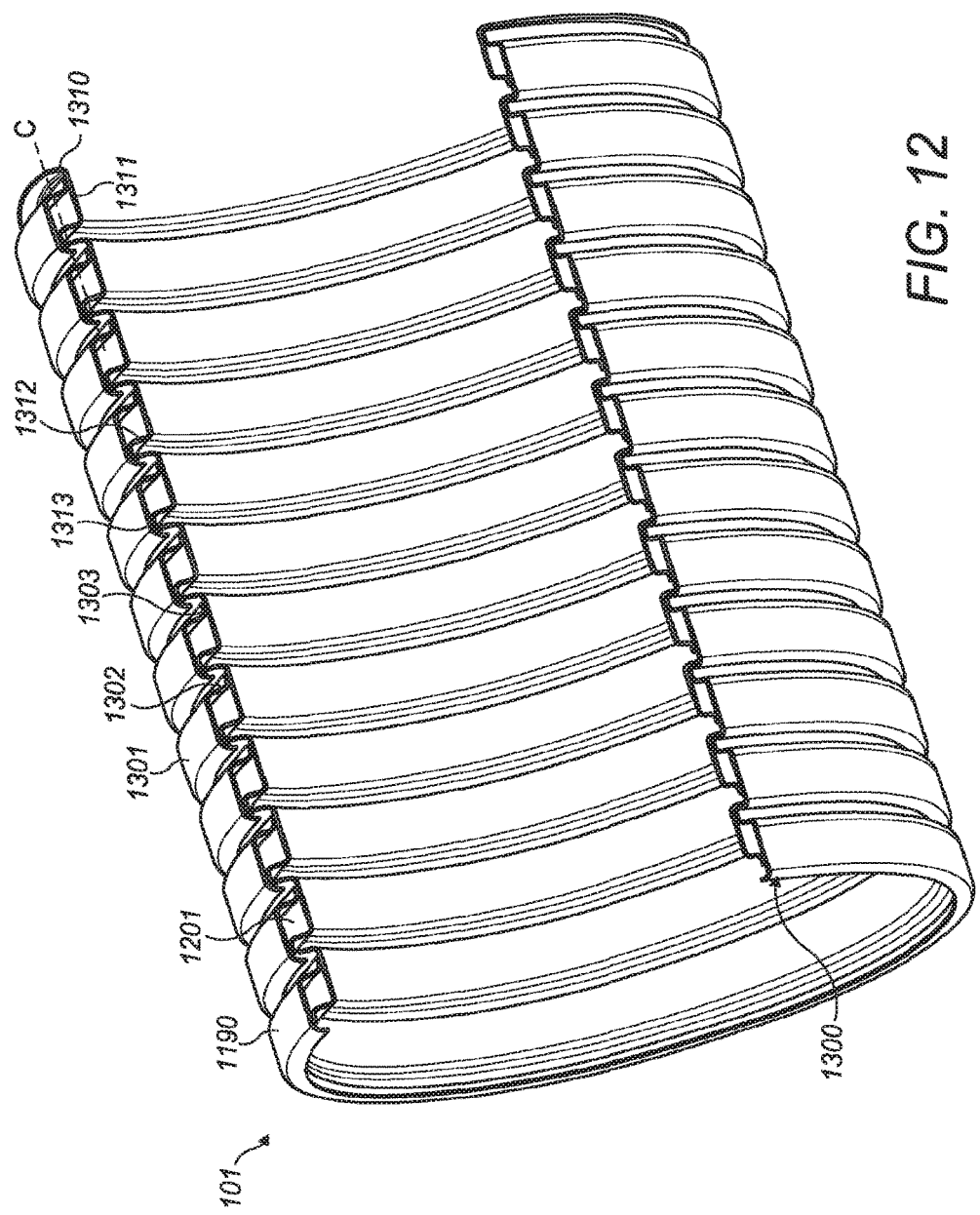
FIG. 12 illustrates a carcass layer.
Figure 13:
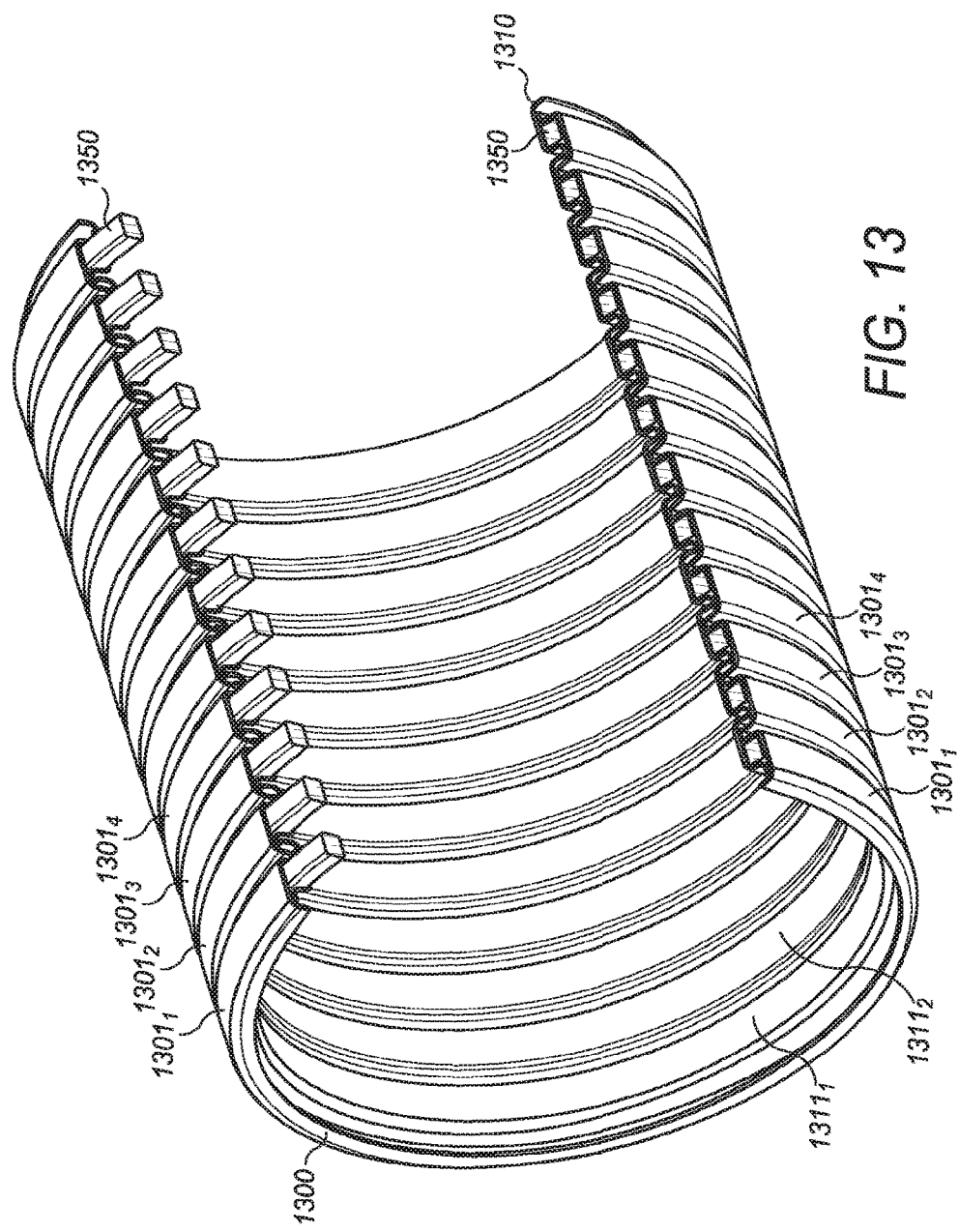
FIG. 13 illustrates the carcass layer of FIG. 12 including filled channel regions.

FIG. 12 illustrates a carcass layer 101 in a length of flexible pipe body in which adjacent windings of a carcass layer tape 1190 interlock together. Each winding thus forms an annular element which extends around an inner circumference of a bore region. As illustrated in FIG. 12 the carcass layer 101 is formed by helically winding the tape 1190 so that adjacent windings are interlocked. A cross section of the carcass tape 1190 is substantially Z-shaped and the body of the tape is wholly or partially hollow. As with the previously described examples the tape body can be a shell encapsulating a single channel or can define more than one channel by having a partially filled body cavity region or plate element separating the central channel. The channel region 1201 is illustrated as being hollow in FIG. 12, although in practice the channel region is filled with a thermally active material. In some embodiments as illustrated in FIG. 13 the channel, or some of the channels, can be filled with a strengthening material 1350. For example, the strengthening element 1350 can be formed of a metal material, such as carbon, stainless steel or the like, whilst the body of the tape 1190 is made from a composite material such as glass fibre, carbon fibre, reinforced plastic or the like.

The wound tape thus forms a layer extending axially along the length of the flexible pipe body. The cross section of the carcass tape 1190 has an imaginary centre line C and has an inwardly turned nose 1300 at a first edge of the tape. The nose 1300 blends into a horizontal region 1301 and the tape is then bent into a substantially linear region 1302 towards the centre line and then away from the centre line. The central region 1302 then turns away from the first edge into a flange region 1303. As illustrated in FIG. 12 the tape 1190 is generated from a first curved wall and a further curved wall. These are tape elements. The tape elements shown have a similar and constant cross section. Aptly the tape elements can have different cross sections, also these may optionally be non-constant. The first curved wall which forms the first nose 1300, horizontal portion 1301, central region 1302 and first flange region 1303 is formed spaced apart from the further curved wall in a middle region thereof. The further curved wall includes an inwardly turned nose 1310 which forms a further edge of the carcass tape. This inwardly turned nose extends into a horizontal region 1311 which then extends in towards the imaginary centre line as a linear region 1312. This linear region then flares out towards the first edge of the tape forming a further flange region 1313. The curved walls are integrally formed or may be separately made and then secured together such as by welding, adhering or the like.

The tape formed by the juxtaposed curved walls may be wound in a helical fashion to form the carcass layer as will be understood by those skilled in the art. The nose of an outer curved wall and flange region of the inner curved wall form a hook region whilst the nose of the inner curved wall and flange region of the first curved wall form a valley region. A hook region of a winding nests within a valley region of an adjacent winding as the carcass layer is manufactured. The channel region 1201 is formed in the parallel spaced apart region between the inner surfaces of the curved walls of the carcass tape. Prior to manufacturing of the flexible pipe body this channel may be filled wholly or partially with a thermally active material. Alternatively, some of the channel regions may be filled with a material having a different mechanical property from the body region formed by the curved walls of the tape. As a result certain materials can be used to form the tape body whilst the same or different materials can be used to wholly or partially fill the channel region which runs along the centre of the carcass tape. This allows a manufacturer of the flexible pipe body to tailor the materials selected according to the purpose for which the flexible pipe is manufactured. Each winding of the carcass tape forms an annular element which thus extends around an inner circumference of a bore region. A channel region is provided within the body portion of the carcass tape.

Figure 14:
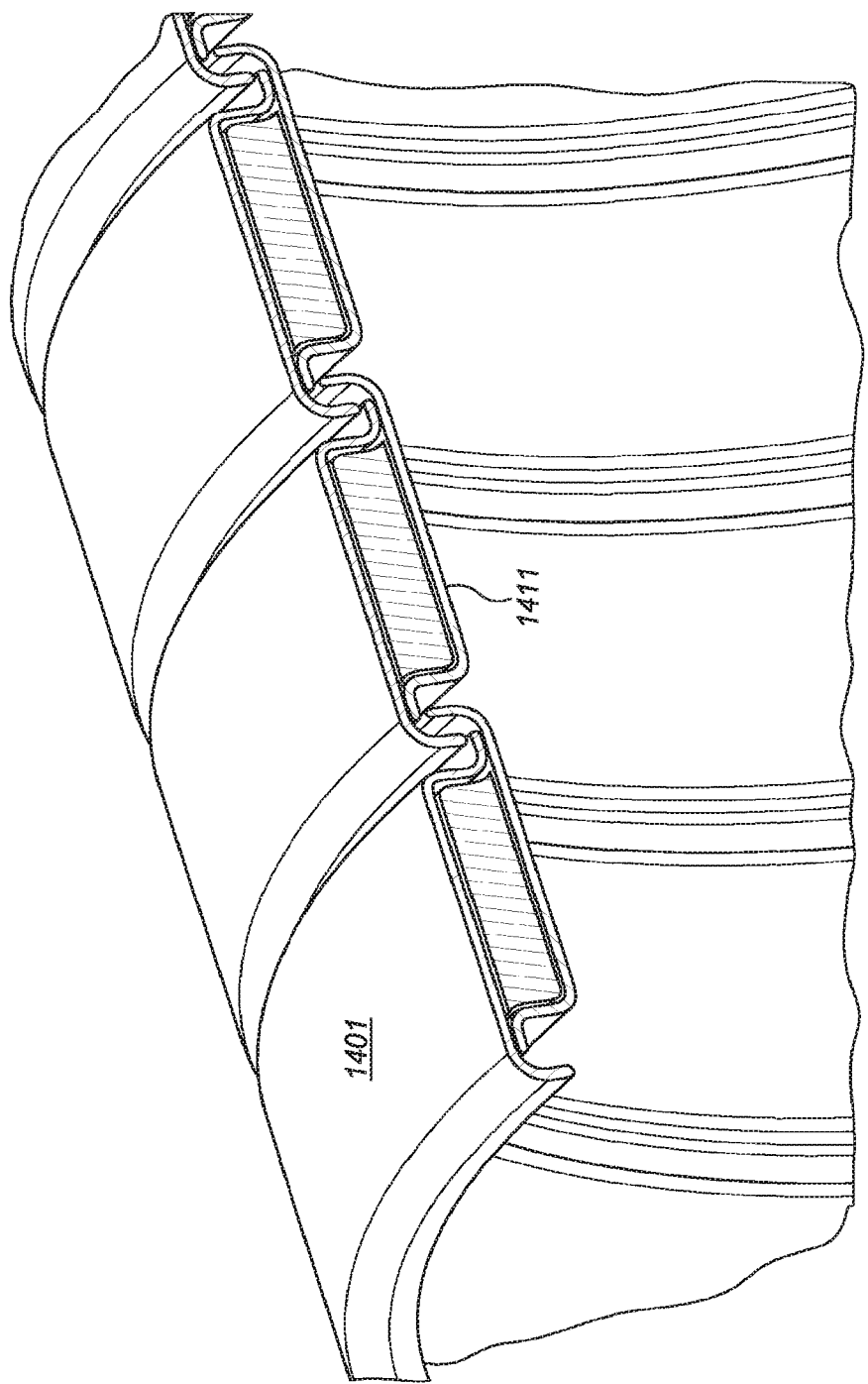
FIG. 14 illustrates an alternative carcass layer.

FIG. 14 illustrates an alternative carcass tape to that illustrated in FIGS. 12 and 13. In many respects this carcass tape is similar to that shown in FIGS. 12 and 13, however, the curved walls of the body of the carcass tape have elongated horizontal portions 1401, 1411 relative to the corresponding portions of the carcass tape shown in FIGS. 12 and 13. This enables the channel region in the carcass tape to have a greater volume per winding and provides a further way in which the physical characteristics of the carcass tape can be modified according to the purpose for which the flexible pipe including the carcass layer is to be used. In particular the channel regions contain a thermally active material. The width and/or thickness of the tape, material of the tape body and material held in the channel within the tape can be selected as desired according to the performance parameters needed in the flexible pipe body. Aptly the width to thickness ratio of the tape is 2:1 or greater. Aptly the width to thickness ratio is 3:1 or greater.

Figure 15:
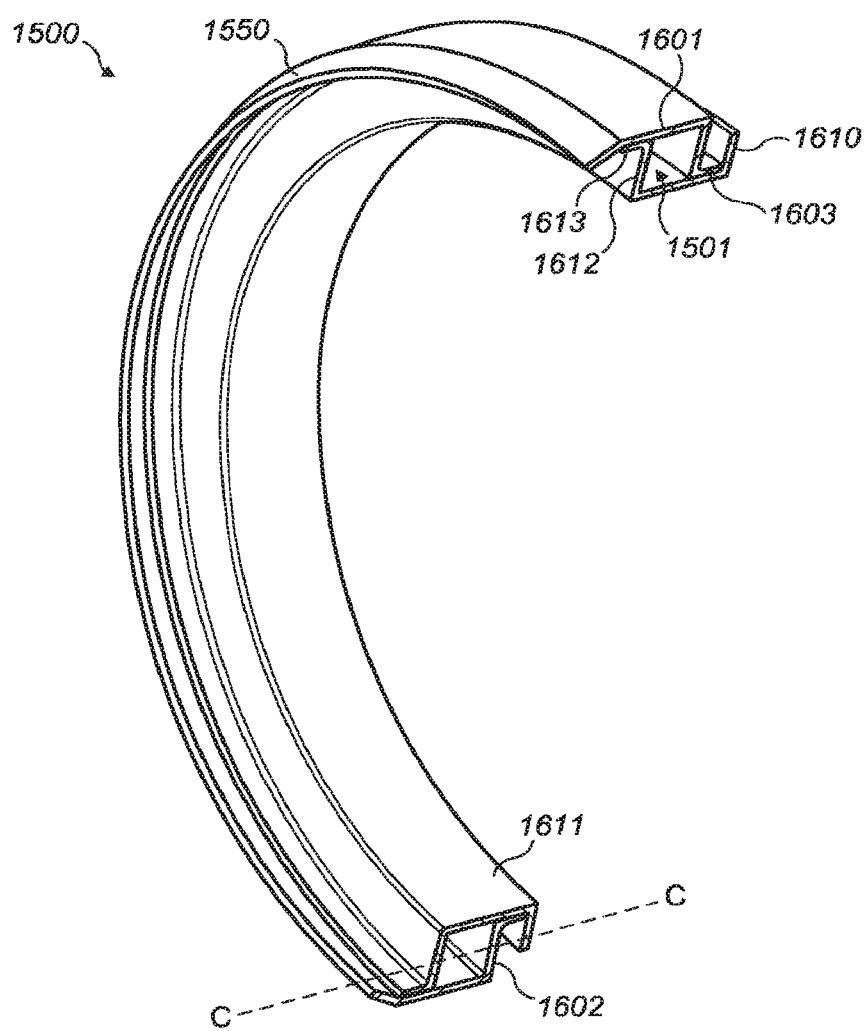
FIG. 15 illustrates a hoop element.

FIG. 15 illustrates a hoop 1500 which includes a hollow channel region 1501 which can be left hollow or which may be filled with a thermally active material or other insulating material or a strengthening material. Multiple hoops may be aligned next to each other in a side-by-side coaxial relationship. The independent hoops can be interlocked together with adjacent hoops being interlocked together so as to form a carcass layer of a flexible pipe body. The hoop 1500 is an annular element with the carcass layer when formed comprising adjacent interlocked annular elements each made up of a body portion that extends around an inner circumference of a bore region. A channel region 1501 is provided within the body portion of each hoop.

As illustrated in FIG. 15 each hoop element has a circular outer surface. The cross section of the hoop 1500 has an imaginary centre line C and has a partially inwardly turned nose 1550 at a first edge of the hoop. The nose 1550 blends into a horizontal region 1601 with the outer surface of this horizontal region provided the circular outer cross section of the hoop. The horizontal region 1601 is then bent towards the imaginary centre line and then away from the centre line in a substantially linear central region 1602. This central region 1602 is then turned away from the first edge of the hoop into a flange region 1603. As illustrated in FIG. 15 the hoop 1500 is generated from a first curved wall and a further curved wall. These are tape elements. The tape elements shown have a similar and constant cross section. Aptly the tape elements can have different cross sections and may optionally have a non-constant cross section. The first curved wall which forms the first nose 1550, horizontal portion 1601, central region 1602 and first flange region 1603 is formed spaced apart from the further curved wall in a middle region thereof. The further curved wall includes an inwardly turned nose 1610, which forms a further edge to the hoop horizontal portion 1611, which has an inner surface forming the inner surface of the hoop. The horizontal region 1611 of the further curved wall bends first towards the imaginary centre line and then continues away from the centre line in a further linear central region 1612 before being bent towards the first edge of the hoop in a further flange region 1613.

Figure 16:
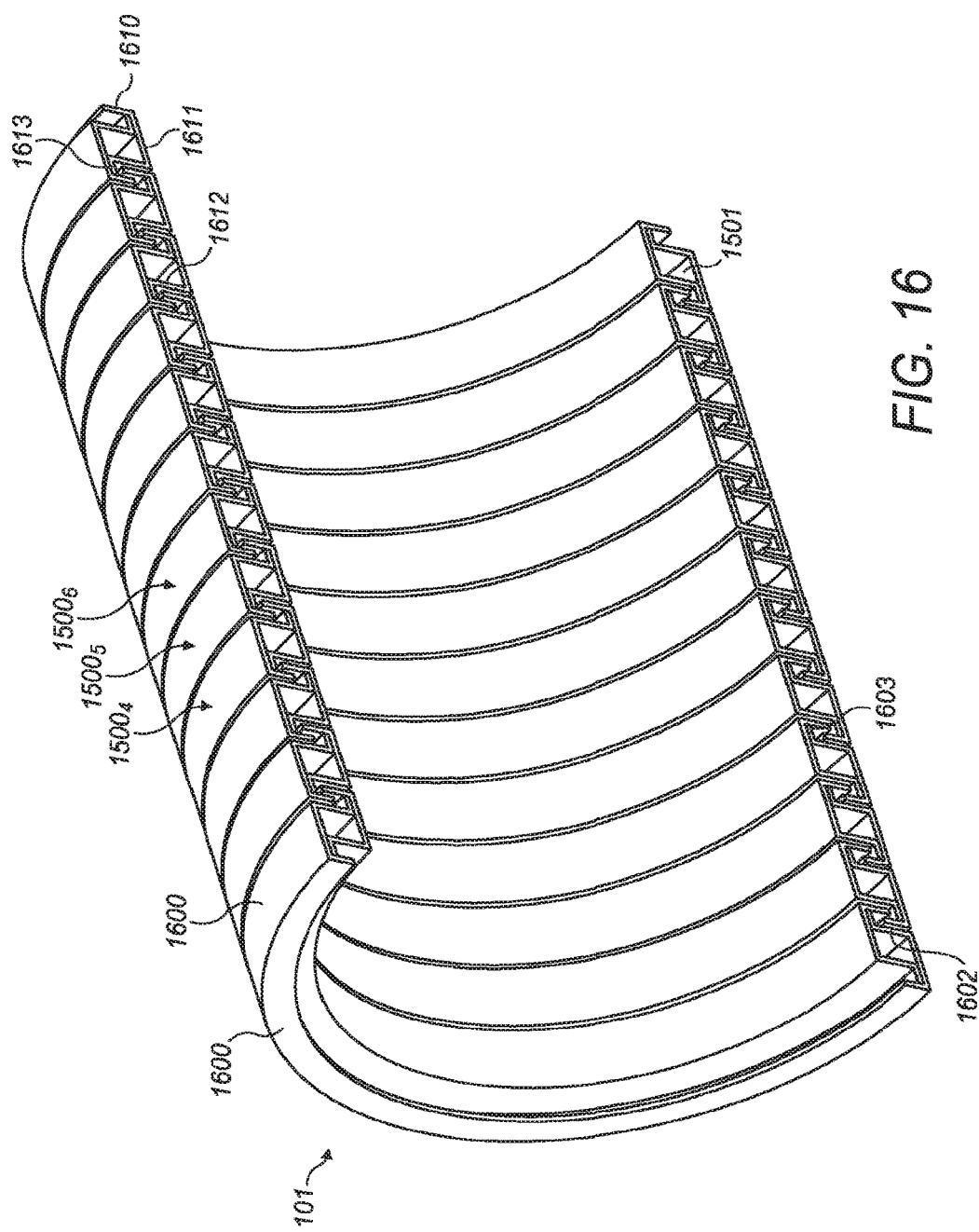
FIG. 16 illustrates interlocked hoop elements.

Unlike the generation of a carcass layer by helically winding a tape the carcass layer of flexible pipe body manufactured with multiple hoop elements of the type shown in FIG. 15 is manufactured by locating hoop elements side-by-side, one-by-one, and bending the nose 1550 at the first edge of the hoop over the upstanding nose 1619 of a preceding hoop. FIG. 16 illustrates the nose 1600 bent inwardly from the partially inclined position 1550 illustrated in FIG. 15.

The nose of an outer curved wall and flange region of an inner curved wall form a hook region whilst the nose of the inner curved wall and flange region of the first curved wall form a valley region. A hook region of a hoop nests within a valley region of an adjacent hoop as the carcass layer is manufactured. The channel region 1501 is formed in the parallel spaced apart region between the juxtaposed curved walls of the carcass hoop. Prior to manufacturing of the flexible pipe body this channel may be filled wholly or partially with a desired material, in particular a thermally active material. Additionally some channels may be filled with a different material, such as an insulating material, for example aerogel material. Alternatively, the channel region is, or some of the channel regions are, filled with a material having a different mechanical property from the body region formed by the curved walls of the hoop. As a result certain materials can be used to form the hoop body whilst different materials (in particular thermally active materials) can optionally be used to wholly or partially fill the channel region which runs along the centre of the hoop. This allows a manufacturer of the flexible pipe body to tailor the material selected according to the purpose for which the flexible pipe is manufactured. Each independent hoop in the carcass layer forms an annular element which thus extends around an inner circumference of a bore region. A channel region is provided within the body portion of the carcass hoop.

An advantage of generating a carcass layer using independent hoop elements which are interlocked together with adjacent hoop elements in a side-by-side coaxial relationship is that the hoop elements may each be manufactured from different materials. Therefore a profile may be generated along the length of flexible pipe body having zones with certain physical characteristics at one region (provided by hoops manufactured from the same or similar materials) and one or more further zones along the length of the flexible pipe body at desired locations where the hoop elements used to manufacture the flexible pipe body in those zones are manufactured from materials different from the materials used for the hoop elements in the first zone.

Figure 17:
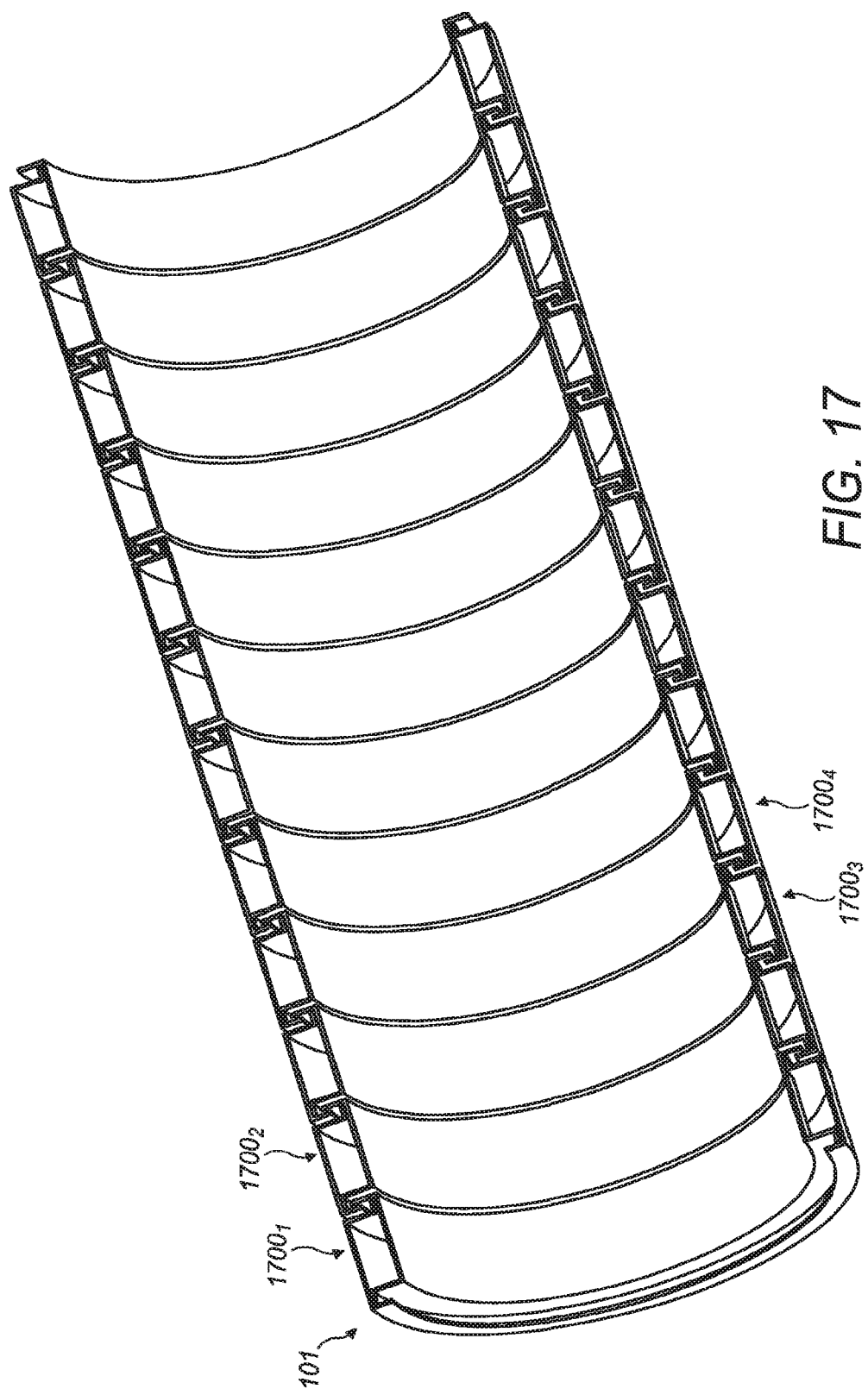
FIG. 17 illustrates alternative hoop elements interlocked.

FIG. 17 illustrates how a carcass layer may be manufactured from interlocking independent hoops having a different cross sectional profile from the hoops illustrated in FIGS. 15 and 16. In many respects the cross section of the hoop elements shown in FIG. 17 are similar to those shown in FIGS. 15 and 16. However, the horizontal portions of the first curved wall and further curved wall are stretched relative to the corresponding portions shown in FIGS. 15 and 16. This enables a different width to thickness ratio of the hoops to be utilised. Aptly the width to thickness ratio of the hoop is 2:1 or greater. Aptly the width to thickness ratio is 3:1 or greater. The variation of the width to thickness ratio enables the volume of the channel region to be selected according to environmental factors which the flexible pipe body will experience in use.

An advantage of using the hoops shown in FIGS. 15, 16 and 17 to manufacture a carcass layer is that each hoop element can be independently manufactured prior to manufacture of the flexible pipe body. These may then be stored until the moment in time when flexible pipe body is to be manufactured. The materials used to manufacture each hoop element can be selected according to a physical performance required of the hoop. The hoops can be integrally formed or can be made from two or more separate walls secured together. These curved walls can be manufactured from the same or different materials. Each hoop is thus preformed prior to manufacture of a carcass layer and a channel formed within the body of the hoop can be left empty or may be filled with a desired material, in particular a thermally active material. If a carcass layer having a high degree of thermal insulation is required an aerogel material or some other insulating material may be loaded into the channel. It will be appreciated that during manufacture of the hoop the channel region within the hoop can optionally first be evacuated to help reduce thermal conductivity across the hoop. Also the use of rigid material (such as metal or composite materials or the like) to manufacture the hoop body means that low density materials, including aerogels and thermally active materials, may optionally be used.

Alternatively some of the channel regions in each hoop can be at least partially filled with a material which will increase the strength of the hoop. That is to say the material which increases the strength of the hoop will increase the ability of the hoop to resist crushing forces. The channel region can of course be filled with any material that provides a desired physical characteristic to the finished carcass layer.

Figure 18:
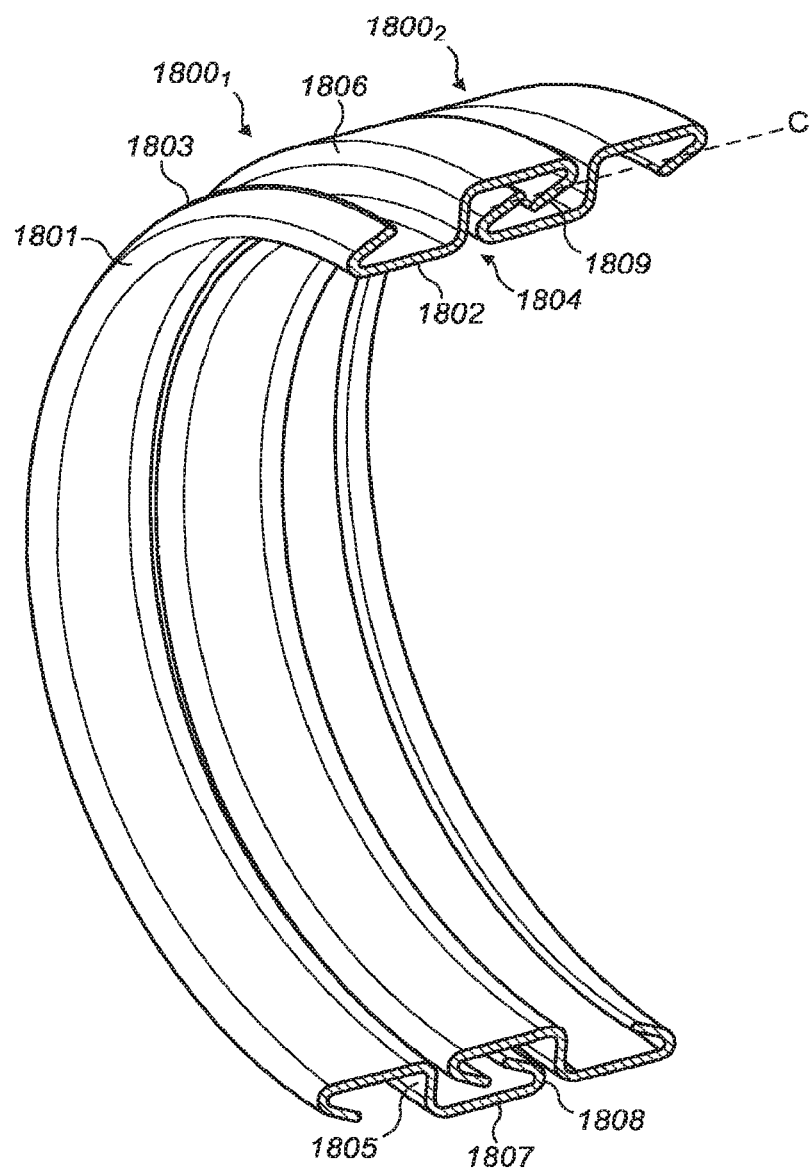
FIG. 18 illustrates alternative interlocked hoop elements.

FIG. 18 illustrates how hoops 1800 which do not have a channel region can be utilised to provide a carcass layer for flexible pipe body. As illustrated in FIG. 18 a hoop has a substantially S-shape. Each hoop element 1800 has an imaginary centre line C and a first edge 1801 of a hoop is formed by a horizontal portion 1802 of the hoop element being bent back partially on itself to form a nose 1803. The horizontal section 1802 is then bent towards the centre line C at a first bend 1804 into a central substantially linear region 1805 which then continues away from the centre line until being bent at a further bend region 1806 into a further horizontal region 1807. This further horizontal region 1807 is substantially parallel to the first horizontal portion 1802 in the cross section of the hoop 1800. The further horizontal portion is then bent back upon itself to form a further edge 1808 of the hoop which extends into an inwardly turned nose 1809.

As illustrated in FIG. 18 multiple hoop elements $1800_1$, $1800_2 \ldots 1800_n$ can be aligned in a side-by-side coaxial relationship and interlocked so as to form a carcass layer in flexible pipe body. The inwardly turned nose 1803 at a first edge of a hoop interlocks with an inwardly turned nose 1809 in an adjacent hoop to ensure that hoop elements do not become separated during use.

Figure 19:
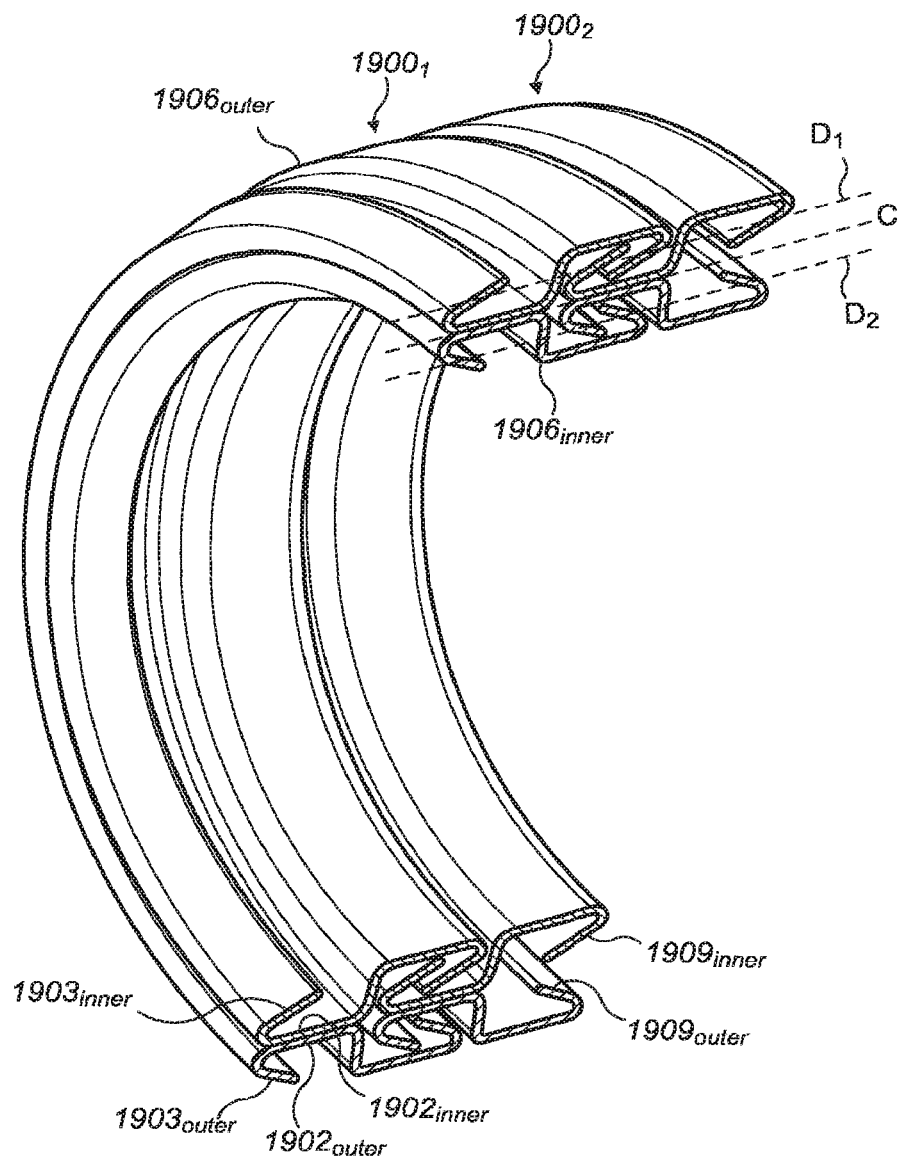
FIG. 19 illustrates interlocked hoop elements.

FIG. 19 illustrates how a carcass layer can be manufactured from interlocked hoops 1900. Each hoop shown in FIG. 19 is formed from a first curved wall of the type illustrated in FIG. 18 and a juxtaposed mirror image of that curved wall formed as a second curved wall secured or integrally formed with the first curved wall. Each hoop 1900 has an imaginary centre line C and an outer part imaginary centre line $D_1$ and an inner part imaginary centre line $D_2$. A first edge 1901 of a hoop comprises twin rings formed by an inner and outer horizontal portion 1902 being bent backward to form respective inner and outer noses 1903. Each of the inner and outer horizontal sections 1902 is then bent away from the main centre line C towards a respective imaginary inner or outer centre line $D_1$, $D_2$. From a respective central substantially linear region 1905 a further bend region 1906 is formed which turns each curved side wall into a respective horizontal region 1907$_{inner}$, 1907$_{outer}$. This further horizontal region 1907 is substantially parallel to the first horizontal portion 1902. The further horizontal portion is then bent back upon itself at a further edge 1908 which is formed as two distinct rings. The bent back horizontal portion forms an inner and outer inwardly turned nose 1909. As will be appreciated by those skilled in the art a carcass layer may be manufactured by interconnecting hoops one by one or many simultaneously by pushing the edges of the hoops together so that the nose regions at a first edge of a hoop interlock with the nose regions of an adjacent hoop. The hoops may be manufactured from the same or different materials. The curved walls of each hoop may be integrally formed or may be secured together by welding, gluing, riveting or the like.

Figure 20:
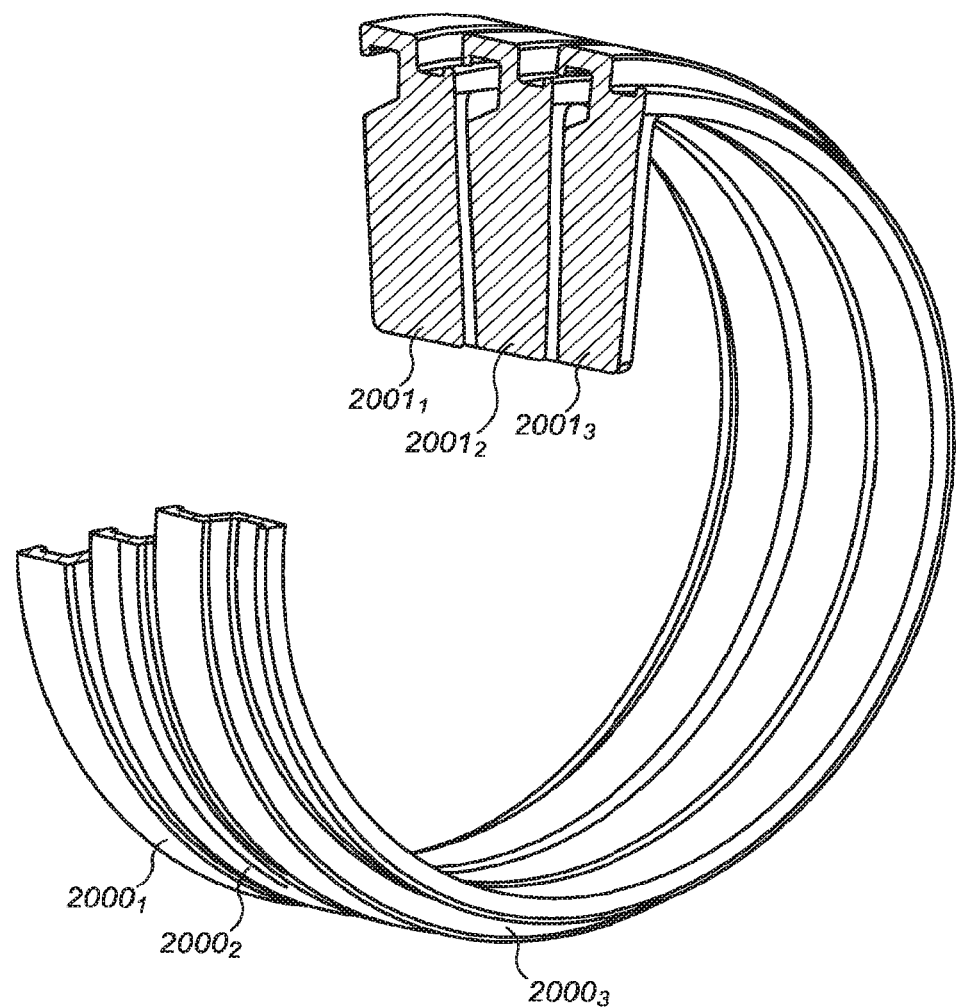
FIG. 20 illustrates hoops with fins.

FIG. 20 illustrates how hoops having a solid cross section (that is to say without an internal channel) may be connected together to form a carcass layer. These hoops each have a respective fin 2001 which is a plate extending from an inner surface of the hoop. The hoops may be aligned and interconnected during a manufacturing process so that the fins are exactly aligned in a linear array axially along the length of the flexible pipe body. Alternatively, each fin or the fins of a group of hoops may be radially offset with respect to fins in an adjacent hoop or adjacent group. As a result it will be appreciated that the rotational offset between the fins can induce a rotation motion in fluid transported along the bore of the flexible pipe body. This can be advantageous in certain environments and/or when certain types of transport fluid are being transported. Fins can of course be used with hoops previously described which include an internal channel.

Figure 21:
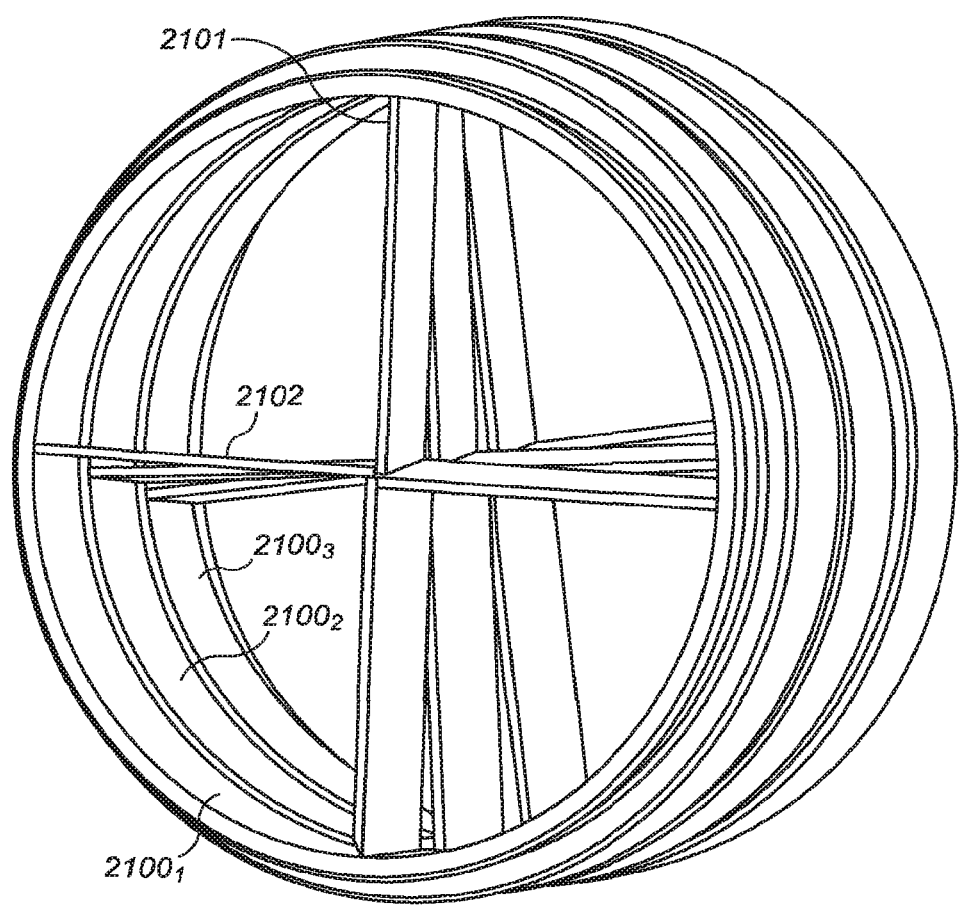
FIG. 21 illustrates hoops with strengthening beams.

FIG. 21 illustrates how multiple hoops may be interlocked together to form a carcass layer of flexible pipe body. As illustrated in FIG. 21 the hoops include cross beams 2101 which extend across a diameter of the hoops. Further cross beams 2102 also extend across the diameter of the hoops at right angles to the first cross beams. It will be appreciated that each cross beam acts as a strengthening element so as to increase the crush resistance of each hoop element. One, two or more cross beams may be utilised per hoop. The cross beams of hoops interlocked together to form a carcass layer may be aligned or may be rotationally offset with respect to one another. Alternatively the cross beams of groups of hoops may be aligned or may be rotationally offset with the cross beams in other groups of hoop elements. The offsetting of cross beams can be used to induce a rotational motioning fluid transported in the bore region. Alternatively/additionally the offsetting of cross beams can provide a flexible pipe body which is resistant to crushing forces at different radial angles. The cross beams can of course alternatively extend across only part of the hoop rather than extending across diametrically.

Figure 22:
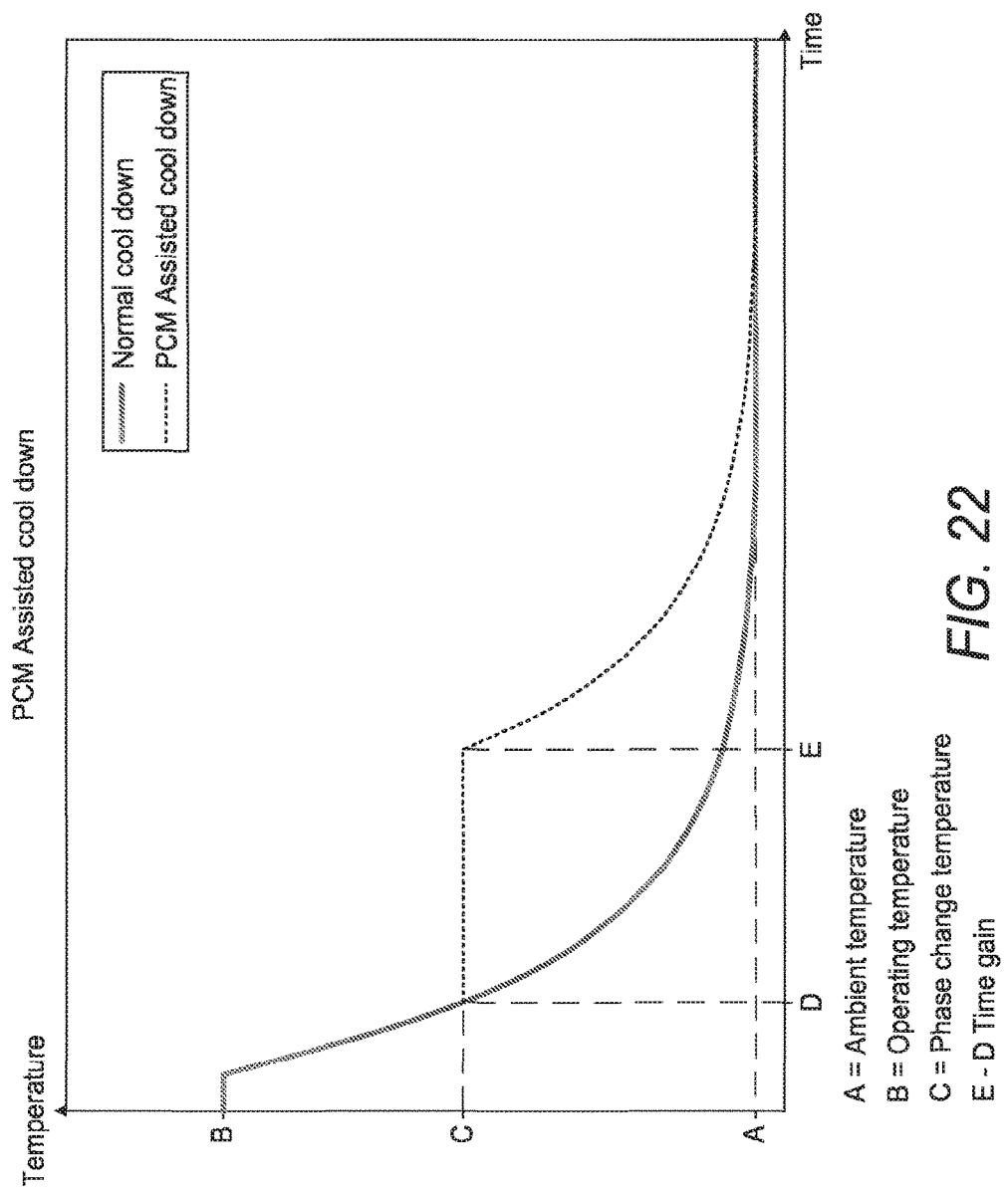
FIG. 22 is a representative typical cooling curve of a sub-sea pipe including a thermally active material in accordance with the present invention.

FIG. 22 shows a typical in situ cooling curve for a fluid in a conventional sub-sea pipe (solid line) during a period of shutdown and a corresponding typical cooling curve for a fluid in a sub-sea pipe according to the invention (chain line). The ambient temperature of the sea surrounding the pipe is shown at A and the normal operating temperature of the fluid in the pipe is shown at B. Thus, at the start of the shut down period, the fluid is at the temperature B and both cooling curves begin at this temperature. The solid curve, representing the conventional pipe follows the expected smooth essentially exponential cooling curve. However, the chain line curve illustrating the pipe according to the invention shows a "resting" period at temperature C, between time D and E, at which the temperature of the fluid remains substantially constant, before beginning to reduce again after time E. Temperature C correlates to the freezing point of the thermally active material in the pipe according to the invention and at this temperature, between times D and E, the latent heat of fusion of the thermally active material is released to the fluid in the pipe. The heat energy released by the thermally active material in the time period from D to E serves to maintain the temperature of the fluid at an at least approximately constant value between times D and E. Temperature C is selected to correlate to the deposition temperature of the fluid, and in practice may conveniently be up to about 5° C. to 10° C. greater than the deposition temperature (as defined hereinabove) of the fluid.

Hoops can be made which have a circular outer shape but are filled in so that an internal bore of the flexible pipe body has a non-circular cross section.

The flexible pipe body according to the invention may include additional layers such as carcass layers, tape layers or layers formed from hoop elements having a corresponding structure to any of the corresponding layers described above, with or without a channel region. Where a channel region is present, a different material may be used in place of the thermally active material, either throughout or in particular zones, areas or regions. For example, such a channel region may contain an insulating material. One preferred example of an insulating material is and aerogel material. Certain preferred aerogel materials are open-celled, mesoporous, solid foams that are composed of a network of interconnected nanostructures and which exhibit a porosity (non-solid volume) of no less than 50%. It will be understood that the term "mesoporous" refers to a material which contains pores ranging from 2 to 50 nm in diameter. It will be appreciated that aerogels can be made from a variety of substances including, but not limited to, most of the transition metal oxides (for example, iron oxide or the like), silica, biological polymers (such as pectin, agar or the like), carbon nanotubes, organic polymers (such as resorcinol-formaldehyde, polyacrylates or the like). Aerogel materials can be manufactured using many different techniques. For example silica gels are produced using the sol-gel process in which nanoparticles suspended in a liquid solution are invoked to interconnect and form a continuous, porous, nanostructured network of particles across the volume of the liquid medium.

It will be understood that the term aerogel refers to a material that has a very low coefficient of thermal conduction. That is to say the coefficient of thermal conduction is preferably 0.05 W/mK or less and aptly 0.02 W/mK or less.

Aerogel materials tend to be hydrophilic but can be made hydrophobic by the addition of waterproofing substances such as trimethylsilyl-$Si(CH_3)_3$. Typical thermal conductivity for aerogels is between 0.004 W/mK to 0.04 W/mK. This is in comparison to typical insulating (but non aerogel) materials used in flexible pipe technologies which have a k value of 0.15 W/mK to 0.18 W/mK.

In alternative variations the channel can hold a vacuum, an insulating tape containing glass microspheres, a foam or the like.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

We claim:

1. A flexible pipe body comprising:
   one or more encapsulated or enclosed regions of thermally active material disposed in a layer of flexible pipe body;
   wherein the thermally active material is a phase change material,
   wherein said one or more regions comprises an annular channel region in a cross section of a hoop element, a plurality of said hoop elements being disposed in a side-by-side coaxial relationship to thereby provide said layer,
   wherein the layer comprising said plurality of hoop elements is the innermost layer of the pipe body.

2. A flexible pipe body in accordance with claim 1, wherein the phase change of the phase change material is from solid to liquid, or from a first solid phase to a second solid phase, on exposure of the phase change material to heat.

3. A flexible pipe body in accordance with claim 1 wherein the thermally active material has a latent heat of fusion of from about 80 $kJkg^{-1}$ to about 500 $kJkg^{-1}$.

4. The flexible pipe body in accordance with claim 1, wherein said layer comprises a carcass layer and/or an insulation layer of the flexible pipe body.

5. The flexible pipe body in accordance with claim 1, wherein each of the plurality of hoop elements is interlocked together, or overlapped, with at least one adjacent hoop element, either directly or with a connecting hoop or clip which engages each adjacent hoop element.

6. The flexible pipe body in accordance with claim 5, wherein a cross section of at least one hoop element comprises a valley region and a hook region that interlocks adjacent hoops in said layer.

7. The flexible pipe body in accordance with claim 5, wherein a cross section of at least one hoop element comprises a recess into which a connecting element or clip may be recessed, that connecting element or clip restricting or constraining either or both radial or axial movement of adjacent hoops in said layer.

8. The flexible pipe body in accordance with claim 1, wherein the layer comprises a continuous layer of thermally active material extending axially along a portion of the flexible pipe body.

9. A flexible pipe comprising the flexible pipe body as claimed in claim 1 and one or more end fittings.

10. A jumper, riser or flowline comprising the flexible pipe as claimed in claim 9.

11. A method of manufacturing flexible pipe body, comprising the steps of:
    providing one or more encapsulated or enclosed regions of thermally active material in a layer of flexible pipe body,
    wherein the thermally active material is a phase change material, and
    wherein the step of providing one or more encapsulated or enclosed regions comprises interlocking a plurality of hoop elements arranged in a side-by-side substantially coaxial relationship, each hoop element comprising an annular channel circling throughout the hoop element,
    and wherein the layer comprising said plurality of hoop elements is the innermost layer of the pipe body.

12. A method of preventing or delaying the cooling of a fluid in a sub-sea pipe below a predetermined threshold temperature, the method comprising providing the pipe with a layer comprising one or more encapsulated or enclosed regions of thermally active material selected to liberate latent heat to the fluid as the fluid temperature approaches said threshold temperature,
    wherein the thermally active material is a phase change material, and
    wherein said one or more regions comprises an annular channel region in a cross section of a hoop element, a plurality of said hoop elements being disposed in a side-by-side coaxial relationship to thereby provide said layer,
    wherein the layer comprising said plurality of hoop elements is the innermost layer of the pipe.

13. A method as claimed in claim 12 wherein the melting point of the thermally active material is not more than about 5° C. to 10° C. greater than said threshold temperature.

14. A method as claimed in claim 12 wherein said threshold temperature represents a temperature at which the fluid in the pipe begins to deposit, or deposits, solid material.

15. A sub-sea pipe or pipe body configured to prevent or delay the cooling of a fluid when present in the sub-sea pipe or pipe body below a predetermined threshold temperature, the sub-sea pipe or pipe body including a layer of one or more encapsulated or enclosed regions of thermally active material configured to liberate latent heat to the fluid as, or if, in use, the fluid temperature approaches said threshold temperature,
    wherein the thermally active material is a phase change material, and
    wherein said one or more regions comprises an annular channel region in a cross section of a hoop element, a plurality of said hoop elements being disposed in a side-by-side coaxial relationship to thereby provide said layer,
    wherein the layer comprising said plurality of hoop elements is the innermost layer of the pipe or pipe body.

16. A sub-sea pipe or pipe body as claimed in claim 15 wherein the melting point of the thermally active material is not more than about 5° C. to 10° C. greater than said threshold temperature.

17. A sub-sea pipe or pipe body as claimed in claim 15 wherein said threshold temperature represents a temperature at which the fluid in the pipe begins to deposit, or deposits, solid material.

18. A sub-sea pipe or pipe body as claimed in claim 15 wherein the thermally active material has a latent heat of fusion of from 80 to 500 kJkg$^{-1}$.

19. A sub-sea pipe or pipe body as claimed in claim 15 wherein the thermally active material has a latent heat of fusion of at least 100 kJkg$^{-1}$ or at least 150 kJkg$^{-1}$ or at least 200 kJkg$^{-1}$ or at least 250 kJkg$^{-1}$.

* * * * *